US012761427B2

(12) United States Patent
Liu et al.

(10) Patent No.: US 12,761,427 B2
(45) Date of Patent: Oct. 13, 2026

(54) OPTICAL DEVICE

(71) Applicant: Advanced Semiconductor Engineering, Inc., Kaohsiung (TW)

(72) Inventors: Tai-Hsiang Liu, Kaohsiung (TW); Hung-Yi Lin, Kaohsiung (TW); Wen Chieh Yang, Kaohsiung (TW)

(73) Assignee: Advanced Semiconductor Engineering, Inc., Kaohsiung (TW)

( * ) Notice: Subject to any disclaimer, the term of this patent is extended or adjusted under 35 U.S.C. 154(b) by 533 days.

(21) Appl. No.: 18/135,077

(22) Filed: Apr. 14, 2023

(65) Prior Publication Data

US 2024/0345337 A1 Oct. 17, 2024

(51) Int. Cl.
*G02B 6/42* (2006.01)

(52) U.S. Cl.
CPC ......... *G02B 6/4214* (2013.01); *G02B 6/4249* (2013.01)

(58) Field of Classification Search
CPC ... G02B 6/4201; G02B 6/4214; G02B 6/4249
See application file for complete search history.

(56) References Cited

U.S. PATENT DOCUMENTS 8,831,437 B2 9/2014 Dobbelaere et al.
2016/0124164 A1* 5/2016 Doerr .................... G02B 6/428 385/14

OTHER PUBLICATIONS

U.S. Appl. No. 18/092,145, filed Dec. 30, 2022, Lin et al.

* cited by examiner

*Primary Examiner* — Michael P Mooney
(74) *Attorney, Agent, or Firm* — Foley & Lardner LLP

(57) ABSTRACT

An optical device is provided. The optical device includes a first photonic component and a second photonic component. The first photonic component is configured to communicate with the second photonic component through a first optical path or an electrical path depending on a distance between the first photonic component and the second photonic component.

20 Claims, 28 Drawing Sheets

OPTICAL DEVICE

BACKGROUND

1. Field of the Disclosure

The present disclosure relates to an optical device, and, in particular, to an optical device including a plurality of photonic components.

2. Description of the Related Art

Silicon-photonic (SiPh) devices have the advantages of high transmission speed and low power loss, and thus have various applications. The transmission/communication between photonic components in a SiPh device mainly relies on light. However, no means or structure provides efficient transmission therebetween.

SUMMARY

In some embodiments, an optical device includes a first photonic component and a second photonic component. The first photonic component is configured to communicate with the second photonic component through a first optical path or an electrical path depending on a distance between the first photonic component and the second photonic component.

In some embodiments, an optical device includes a first photonic component, a second photonic component, and a third photonic component. The second photonic component is configured to communicate with the first photonic component through a first optical path. The third photonic component is configured to communicate with the second photonic component through a second optical path and to communicate with the first photonic component through a third optical path.

In some embodiments, an optical device includes a first photonic component and a second photonic component. The second photonic component is configured to communicate with the first photonic component through a first optical path. A distance between the first photonic component and the second photonic component is larger than a third photonic components in the optical device.

BRIEF DESCRIPTION OF THE DRAWINGS

Aspects of some embodiments of the present disclosure are readily understood from the following detailed description when read with the accompanying figures. It should be noted that various structures may not be drawn to scale, and dimensions of the various structures may be arbitrarily increased or reduced for clarity of discussion.

FIG. 1A-1 is an enlarged view of a portion of an optical interposer according to some embodiments of the present disclosure.

DETAILED DESCRIPTION

Figure 1:
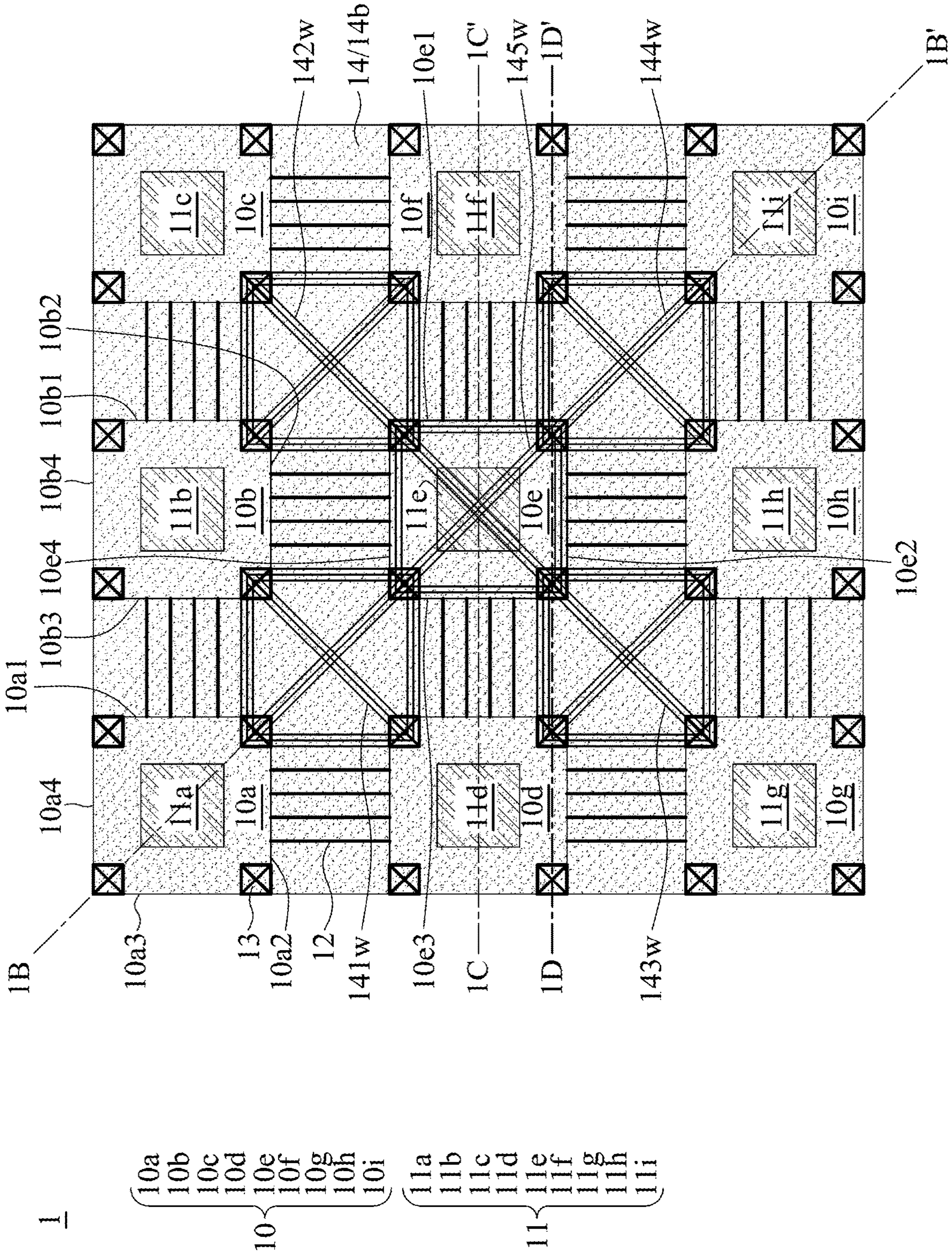
FIG. 1 is a top view of an optical device according to some embodiments of the present disclosure.

Common reference numerals are used throughout the drawings and the detailed description to indicate the same or similar components. Embodiments of the present disclosure will be readily understood from the following detailed description taken in conjunction with the accompanying drawings.

The following disclosure provides many different embodiments, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a top view of an optical device 1 according to some embodiments of the present disclosure. The optical device 1 may include a plurality of photonic components 10, a plurality of electrical components 11, a plurality of conductive wires 12, a plurality of input/output units (I/O units) 13, an optical interposer 14.

The photonic components 10 include photonic components 10*a*, 10*b*, 10*c*, 10*d*, 10*e*, 10*f*, 10*g*, 10*h*, and 10*i*. Each of the photonic components 10*a*, 10*c*, 10*g*, and 10*i* may be referred to as a corner photonic component. Each of the photonic components 10*b*, 10*d*, 10*f*, and 10*h* may be referred to as a side photonic component. The photonic component 10*e* may be referred to as a center photonic component. The photonic components 10 may be arranged as an array, e.g., 3*3 array as shown in FIG. 1. FIG. 1 illustrates one arrangement of the photonic components 10 but does not limit the scope of the present disclosure. In yet another embodiment, the photonic components 10 may include more photonic components arranged in an array, e.g., M*N, wherein M is a positive integer and N is a positive integer.

Each of the photonic components 10 may have a plurality of lateral surfaces facing different directions. For example, the photonic component (or the corner photonic component) 10*a* has a lateral surface 10*a*1 directly facing the adjacent side photonic component 10*b*, a lateral surface 10*a*2 directly facing the adjacent side photonic component 10*d*, a lateral surface 10*a*3 opposite to the lateral surface 10*a*1, and a lateral surface 10*a*4 opposite to the lateral surface 10*a*2. None of lateral surfaces 10*a*1-10*a*4 of the photonic component 10*a* directly faces at least one of the photonic components 10*c*, 10*e*, 10*f*, 10*g*, 10*h*, and 10*i*. The photonic component (or the side photonic component) 10*b* has a lateral surface 10*b*1 directly facing the adjacent corner photonic component 10*c*, a lateral surface 10*b*2 directly facing the center photonic component 10*e*, a lateral surface 10*b*3 directly facing the lateral surface 10*a*1 of the adjacent corner photonic component 10*a*, and a lateral surface 10*b*4 opposite to the lateral surface 10*b*2. The photonic component (or the center photonic component) 10*e* has a lateral surface 10*e*1 directly facing the adjacent side photonic component 10*f*, a lateral surface 10*e*2 directly facing the adjacent side photonic component 10*h*, a lateral surface 10*e*3 directly facing the adjacent side photonic component 10*d*, and a lateral surface 10*e*4 directly facing the lateral surface 10*b*2 of the adjacent side photonic component 10*b*.

In some embodiments, the term "directly face (or facing)" in the present disclosure means that two facing surfaces (or lateral surfaces) overlap in a direction normal to the surfaces. For example, the lateral surface 10*a*1 of the photonic component 10*a* directly faces the lateral surface 10*b*3 of the photonic component 10*b* since the lateral surfaces 10*a*1 and 10*b*3 overlap in a direction normal thereto.

The photonic component 10*a* may be directly adjacent to the photonic component 10*b* or 10*d*. In some embodiments, the term "directly adjacent (to)" in the present disclosure means that no intervening component is disposed between two analogous components, and that the lateral surfaces thereof directly face each other (however, other types of elements, e.g., wires, may be disposed in the area between two such components). For example, no photonic component is disposed between the two directly adjacent photonic components 10*a* and 10*b* in a direction perpendicular to the lateral surfaces 10*a*1 and 10*b*3, which directly face each other. Furthermore, the photonic components 10*a* and 10*c* are non-adjacent (opposite to the "directly adjacent") to each other since the photonic component 10*b* is disposed between the photonic components 10*a* and 10*c*. The photonic components 10*a* and 10*e* are non-adjacent to each other since their lateral surfaces do not directly face each other.

The photonic components 10 may be configured to receive and process an optical signal and output an electrical signal to, for example, the electrical components 11. The photonic components 10 may be configured to receive and process an electrical signal and output an optical signal to, for example, the optical interposer 14. The photonic components 10 may each include a photonic IC (PIC). The photonic components 10 may each include, for example, but are not limited thereto, a waveguide, an electro-optic conversion unit (such as a photodiode or a laser), a beam splitter, a modulator, etc.

The electrical components 11 may include electrical components 11*a*, 11*b*, 11*c*, 11*d*, 11*e*, 11*f*, 11*g*, 11*h*, and 11*i*. Each of the electrical components 11*a*, 11*c*, 11*g*, and 11*i* may be referred to as a corner electrical component. Each of the electrical components 11*b*, 11*d*, 11*f*, and 11*h* may be referred to as a side electrical component. The electrical components 11*e* may be referred to as center electrical components. The electrical components 11 may be arranged as an array, e.g., 3*3 array as shown in FIG. 1. FIG. 1 illustrates one arrangement of the electrical components 11 but does not limit the scope of the present disclosure. In yet another embodiment, the electrical components 11 may include more electrical components arranged in an array, e.g., M*N, wherein M is a positive integer and N is a positive integer.

Each of the electrical components 11 may be configured to communicate with the corresponding photonic component. Each of the electrical components 11 may be electrically connected to the corresponding photonic component. Each of the electrical components 11 may be surrounded by the corresponding photonic component. Furthermore, each of the electrical components 11 may be embedded in the corresponding photonic component. For example, the electrical component 11*a* may be configured to communicate with, be electrically connected to, be surrounded by, and/or be embedded in the corresponding photonic component 10*a*. Each of the electrical components 11 may include a passive component, such as a resistor, or an active component, such as an amplifier. The electrical components 11 may be configured to modulate or amplify the signals from the photonic components 10.

The conductive wires 12 may be disposed between the two directly adjacent photonic components 10. For example, the conductive wires 12 may be disposed between the photonic components 10*a* and 10*b*, 10*a* and 10*d*, etc. The two directly adjacent photonic components 10 may be configured to communicate with each other in an electrical path established in the conductive wires 12. The conductive wires 12 may extend in a direction substantially normal to the lateral surfaces of the connected photonic components 10. The conductive wires 12 may include metal such as copper (Cu), gold (Au), aluminum (Al), titanium (Ti) or the like. The conductive wires 12 may be covered by or embedded in a dielectric layer (not shown in FIG. 1 for brevity).

The I/O units (or transceivers) 13 may be disposed in the photonic components 10. The I/O units 13 may be disposed at the corners of each of the photonic components 10. For example, the I/O units 13 may be disposed at the corners of the photonic component 10*a*. The I/O units 13 may be optically coupled with the photonic components 10, e.g., the waveguides therein. The I/O units 13 may include a grating structure transmitting an optical signal to the optical interposer 14 or receiving an optical signal from the optical interposer 14. The I/O units 13 and the conductive wires 12 may have different pattern densities. The pattern density of the conductive wires 12 may be greater than that of the I/O units 13. In some embodiments, the conductive wires 12 may have a relatively high bandwidth.

The optical interposer 14 may be disposed over the photonic components 10, the electrical components 11, the conductive wires 12, and/or the I/O units 13. The optical interposer 14 may cover the photonic components 10, the electrical components 11, the conductive wires 12, and/or the I/O units 13. The area of the optical interposer 14 may be substantially equal to the distribution area of the photonic components 10. Sides of the optical interposer 14 may be aligned with the lateral surfaces (e.g., 10*a*3 or 10*b*4) of the photonic components 10. The optical interposer 14 may be formed in one piece. For the purpose of explaining the location relationship among the photonic components 10, the electrical components 11, and the optical interposer 14, the photonic components 10 and the electrical components 11 disposed below the optical interposer 14 are depicted with solid lines. The optical interposer 14 may include, for example, but is not limited thereto, a silicon, silicon oxide, or silicon nitride, etc.

The optical interposer 14 may include a body portion 14*b*. The optical interposer 14 may include a plurality of waveguides 141*w*, 142*w*, 143*w*, 144*w*, and 145*w*. The waveguides 145*w* may be disposed over the center photonic component 10*e*. The waveguides 141*w*, 142*w*, 143*w*, and 144*w* may be disposed between the corner photonic component and the center photonic component 10*e*. For example, the waveguides 141*w* may be disposed between the photonic components 10*a* and 10*e*. The waveguides 141*w*, 142*w*, 143*w*, and 144*w* may be separated from each other. The waveguides 141*w*, 142*w*, 143*w*, and 144*w* may be optically coupled to each other through the waveguides 145*w*. The optical interposer 14 with waveguides 141*w*-145*w* may function as a bridge unit optically coupling to the photonic components 10. For example, the waveguides 141*w* may optically couple to the photonic components 10*a*, 10*b*, 10*d*, and 10*e*. The waveguides 141*w*, 142*w*, 143*w*, 144*w*, and 145*w* may optically couple to the I/O units 13. The waveguides 141*w*, 142*w*, 143*w*, 144*w*, and 145*w* have a relatively low power loss during the signal transmission compared to the conductive wires 12.

The waveguides 141*w*, 142*w*, 143*w*, and 144*w* may each include at least one waveguide extending diagonally between two non-adjacent photonic components and at least one waveguide extending perpendicularly between two directly adjacent photonic components. The waveguides 145*w* may include at least one waveguide extending diagonal to the photonic component 10*e* and at least one waveguide extending perpendicular to the lateral surface 10*e*1 or 10*e*2 of the photonic component 10*e*.

The optical interposer 14 may partially define an optical path between two non-adjacent photonic components 10. For example, a portion of the optical interposer 14 including the waveguides 141*w* may define an optical path between the non-adjacent photonic components 10*a* and 10*e*. A portion of the optical interposer 14 including the waveguides 144*w* may define an optical path between the non-adjacent photonic components 10*e* and 10*i*. A portion of the optical interposer 14 including the waveguides 141*w*, 144*w*, and 145*w* may define an optical path between the non-adjacent photonic components 10*a* and 10*i*. A portion of the optical interposer 14 including the waveguides 141*w* and 142*w* may define an optical path between the non-adjacent photonic components 10*a* and 10*c*.

Figure 1A:
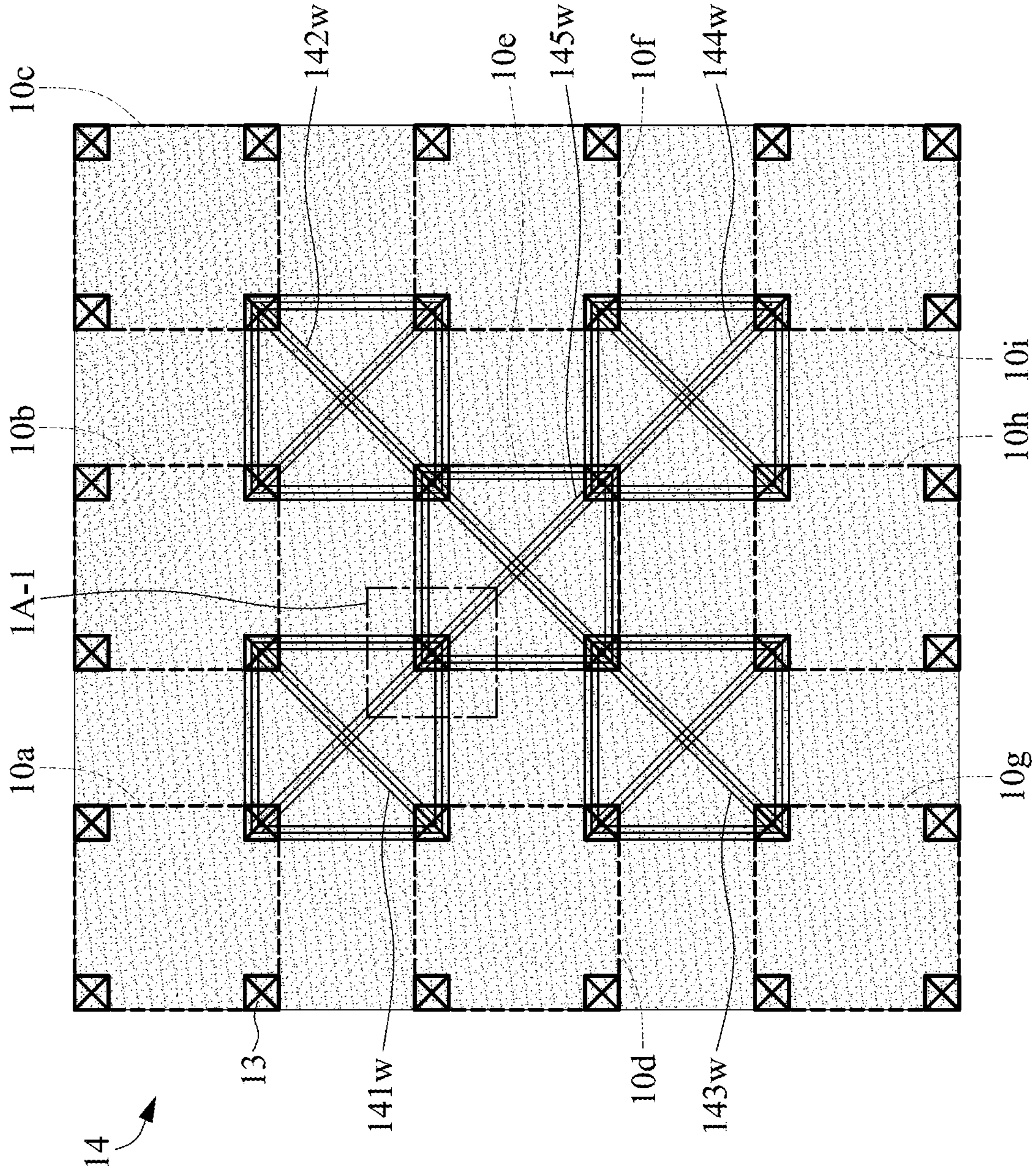
FIG. 1A is a top view of an optical interposer according to some embodiments of the present disclosure.
Figures 1, 1A:
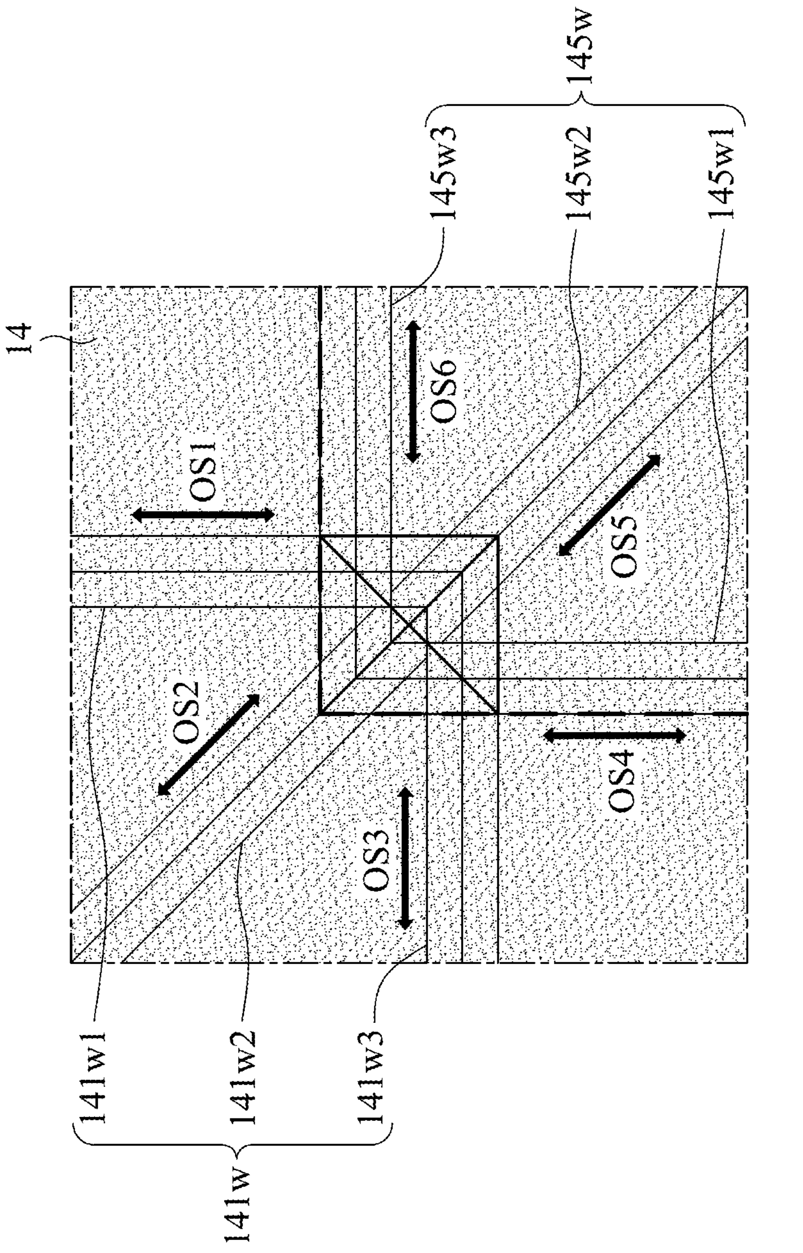

FIG. 1A is a top view of an optical interposer (e.g., the optical interposer 14) according to some embodiments of the present disclosure. FIG. 1A provides a complete layout of the optical interposer 14. The optical interposer 14 may cover the photonic components 10*a*-10*i*, which are depicted as dashed enclosures in FIG. 1A. The I/O units 13 are presented in FIG. 1A for the purpose of explaining the connection between the waveguides 141*w*-145*w* and the I/O units 13.

FIG. 1A-1 is an enlarged view of a portion of an optical interposer (e.g., the optical interposer 14) according to some embodiments of the present disclosure. FIG. 1A-1 may be an enlarged view of the box 1A-1 in FIG. 1A. The waveguides 141*w* may include waveguides 141*w*1, 141*w*2, 141*w*3 optically coupled to the I/O unit 13 of the photonic component 10*e* (referring back to FIG. 1A). The waveguides 145*w* may include waveguides 145*w*1, 145*w*2, 145*w*3 optically coupled to the I/O unit 13. A portion of the waveguides 145*w* may be a portion of the waveguides 141*w*. In FIG. 1A-1, the 141*w*1 and 145*w*1 extend in a first direction (or vertically); the 141*w*2 and 145*w*2 extend in a second direction (or diagonally); the 141*w*3 and 145*w*3 extend in a third direction (or horizontally).

The waveguide 141*w*1 may transmit an optical signal OS1 between the I/O unit 13 of the photonic component 10*e* and another I/O unit 13 of the photonic component 10*b* (referring back to FIG. 1A). The waveguide 141*w*2 may transmit an optical signal OS2 between the I/O unit 13 of the photonic component 10*e* and another I/O unit 13 of the photonic component 10*a* (referring back to FIG. 1A). The waveguide 141*w*3 may transmit an optical signal OS3 between the I/O unit 13 of the photonic component 10*e* and another I/O unit 13 of the photonic component 10*d* (referring back to FIG. 1A). The waveguide 145*w*1 may transmit an optical signal OS4 between the I/O unit 13 of the photonic component 10*e* and another I/O unit 13 of the photonic component 10*h* (referring back to FIG. 1A). The waveguide 145*w*2 may transmit an optical signal OS5 between the I/O unit 13 of the photonic component 10*e* and another I/O unit 13 of the photonic component 10*i* (referring back to FIG. 1A). The waveguide 145*w*3 may transmit an optical signal OS6 between the I/O unit 13 of the photonic component 10*e* and another I/O unit 13 of the photonic component 10*f* (referring back to FIG. 1A).

Figure 1B:
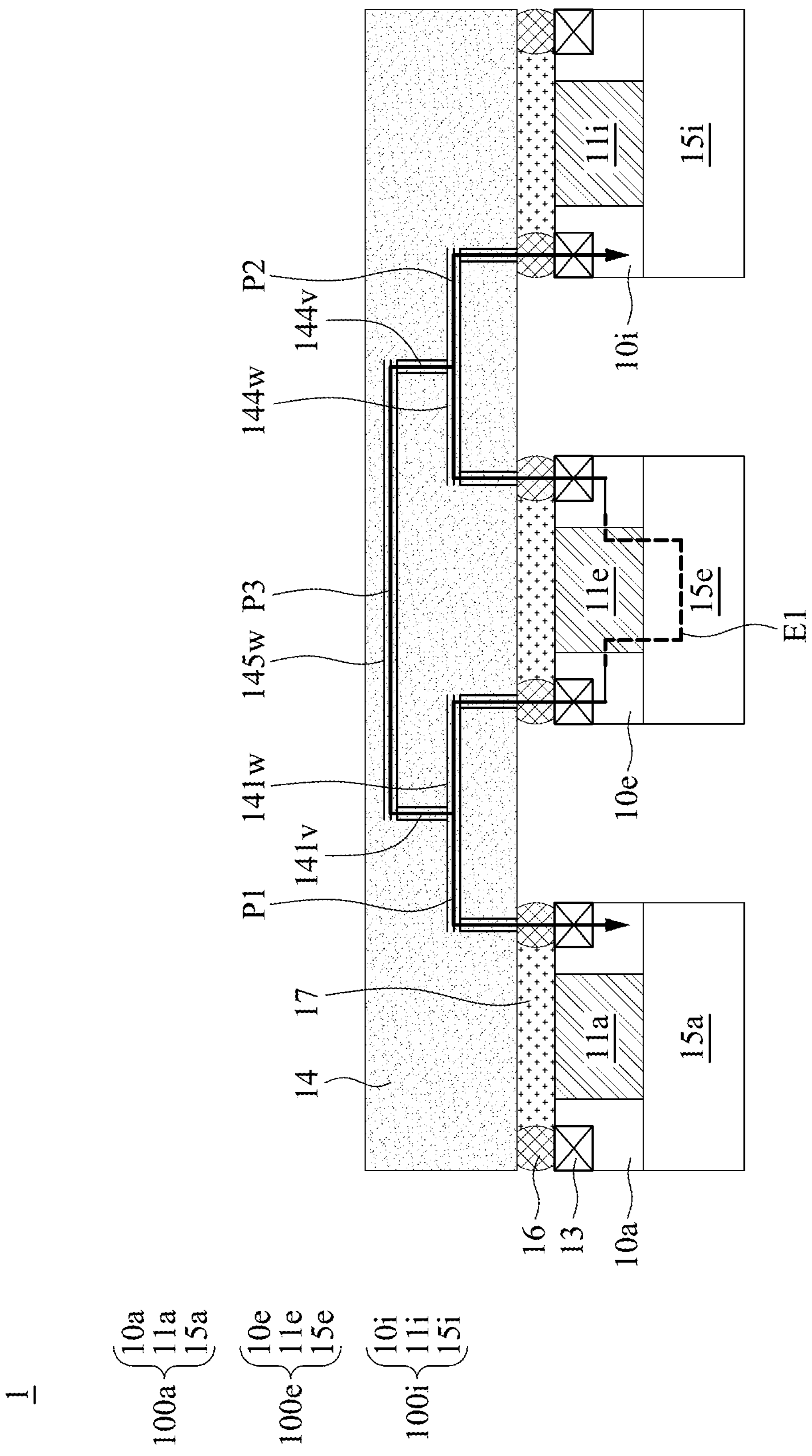
FIG. 1B is a cross section of an optical device according to some embodiments of the present disclosure.

FIG. 1B is a cross section of an optical device (e.g., the optical device 1) according to some embodiments of the present disclosure. FIG. 1B may be a cross section along the line 1B-1B' of FIG. 1.

The optical device 1 may include a plurality of components 15*a*, 15*e*, and 15*i*, respectively disposed below the photonic components 10*a*, 10*e*, and 10*i*. The photonic component 10*a*, the electrical component 11*a*, and the component 15*a* may be referred to as a die 100*a*. Other associated photonic components, electrical components, etc., may be referred to as dies, such as dies 100*e* and 100*i*. The photonic component 10*a* and the electrical component 11*a* may be stacked on the component 15*a*. The component 15*a* may include a central processing unit (CPU), a microprocessor unit (MPU), a graphics processing unit (GPU), a microcontroller unit (MCU), and an application-specific integrated circuit (ASIC). The components 15*e* and 15*i* may be similar to the component 15*a*.

The optical device 1 may include a plurality of connection elements 16 connecting the optical interposer 14 and the I/O units 13. The connection elements 16 may include material for guiding the light (e.g., optical signals) therethrough. The connection elements 16 may include a photonic bump configured to optically transmit the light (e.g., optical signals) from the optical interposer 14 to the I/O units 13 or in an opposite direction. The optical device 1 may include a dielectric layer 17 disposed between the optical interposer 14 and the dies (e.g., the die 100*a*). The dielectric layer 17 may include an epoxy resin having fillers, a molding compound (e.g., an epoxy molding compound or other molding compound), polyimide, a phenolic compound or material, a material with a silicone dispersed therein, or a combination thereof.

As shown in FIG. 1B, the photonic component 10*a* (or the die 100*a*) may be configured to communicate with the photonic component 10*e* (or the die 100*e*) through an optical path P1 at least established in the I/O units 13, the connection elements 16, and the waveguides 141*w*. The photonic component 10*e* (or the die 100*e*) may be configured to communicate with the photonic component 10*i* (or the die 100*i*) through an optical path P2 at least established in the I/O units 13, the connection elements 16, and the waveguides 144*w*.

The photonic component 10*a* (or the die 100*a*) may be configured to communicate with the photonic component 10*i* (or the die 100*i*) through an optical path P3 at least established in the I/O units 13, the connection elements 16, and the waveguides 141*w*, 144*w*, and 145*w*. As such, the photonic component 10*a* may be configured to directly transmit a light to the photonic component 10*i* without an optical to electrical conversion. The optical path P3 may be configured to connect the optical path P1 with the optical path P2. In some embodiments, the optical path P3 may be across the optical path P1 and the optical path P2.

The waveguides 145*w* may be disposed over the waveguides 141*w* and 144*w*. The waveguides 141*w* may include an upper waveguide substantially aligned with the waveguides 145*w* and a lower waveguide under the upper waveguide. The upper waveguide may be connected to the lower waveguide through a conductive via 141*v*. Similarly, an upper waveguide of the waveguide 144*w* may be connected to a lower waveguide of the waveguide 144*w* through a conductive via 144*v*.

In some embodiments, the center photonic component 10*e* may be configured to process the optical signal from the photonic component 10*a* before it is transmitted to the photonic component 10*i*. In this case, the photonic component 10*a* (or the die 100*a*) may be configured to communicate with the photonic component 10*i* (or the die 100*i*) through the optical path P1, an electrical path E1, and the optical path P2. The electrical path E1 may be at least established in the circuit layers in the photonic component 10*e*, the electrical component 11*e*, and the component 15*e*. The electro-optic conversion unit (not shown) of the photonic component 10*e* may be configured to convert an optical signal from the optical path P1 into an electrical signal and transmit it into the electrical path E1. As such, the photonic component 10*a* may be configured to directly transmit a light to the photonic component 10*i* with at least one optical to electrical conversion.

Figure 1C:
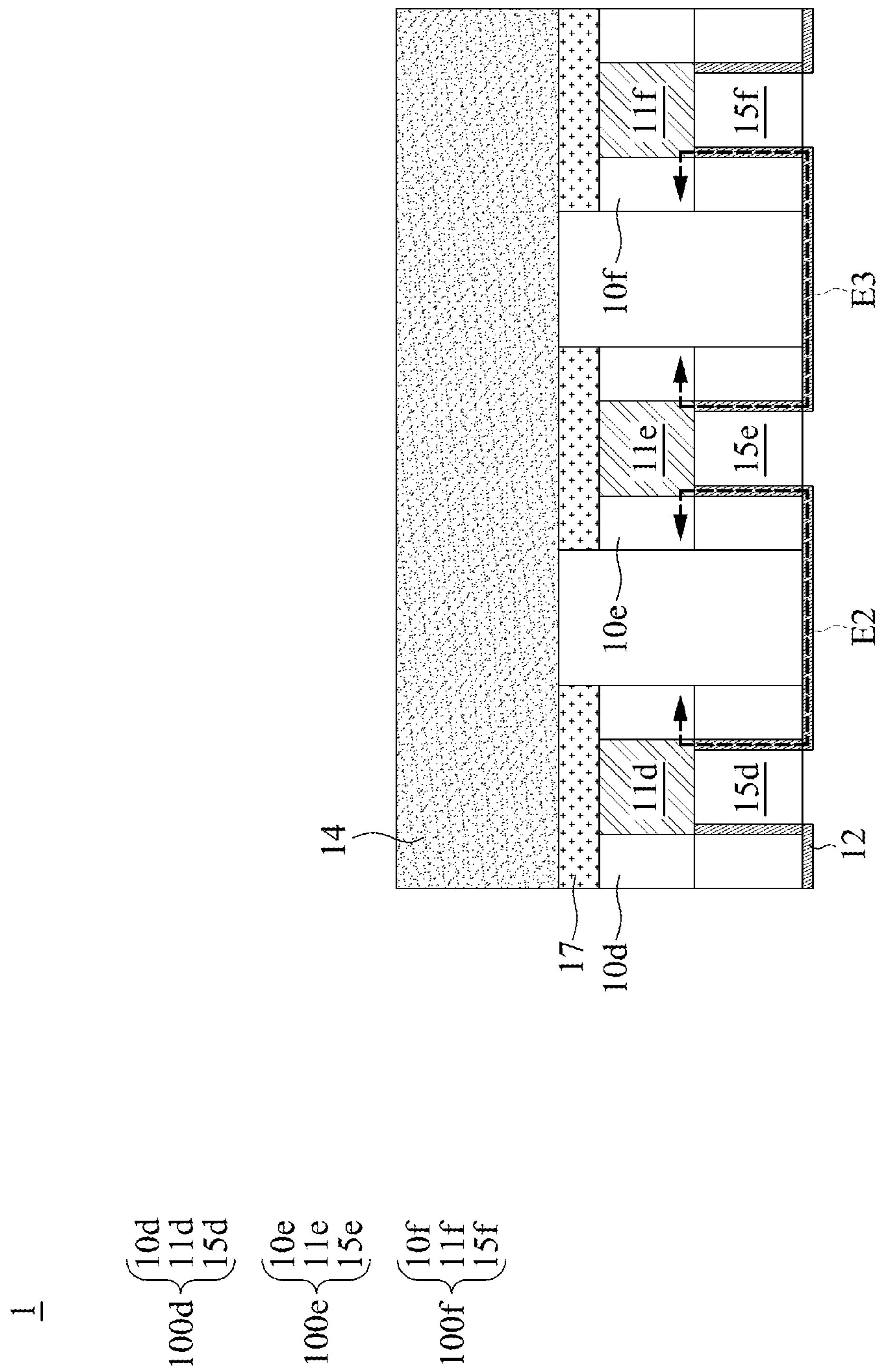
FIG. 1C is a cross section of an optical device according to some embodiments of the present disclosure.

FIG. 1C is a cross section of an optical device (e.g., the optical device 1) according to some embodiments of the present disclosure. FIG. 1C may be a cross section along the line 1C-1C' of FIG. 1.

The optical device 1 may include a plurality of components 15*d*, 15*e*, and 15*f*, respectively disposed below the photonic components 10*d*, 10*e*, and 10*f*. The photonic component 10*d*, the electrical component 11*d*, and the component 15*d* may be referred to as a die 100*d*. Other associated photonic components, electrical components, etc., may be referred to as dies, such as die 100*f*.

As shown in FIG. 1C, the conductive wires 12 may have a portion extending in the components 15*d*, 15*e*, and 15*f* and a portion extending at a lower surfaces of the components 15*d*, 15*e*, and 15*f*. The conductive wires 12 may be electrically connected to the electrical components 11*d*, 11*e*, and 11*f*. The conductive wires 12 may be electrically connected to the components 15*d*, 15*e*, and 15*f*. The photonic component 10*d* (or the die 100*d*) may be configured to communicate with the directly adjacent photonic component 10*e* (or the die 100*e*) through an electrical path E2 at least established in the electrical components 11*d* and 11*e*, the components 15*d* and 15*e*, and the conductive wires 12. Similarly, the photonic component 10*e* (or the die 100*e*) may be configured to communicate with the directly adjacent photonic component 10*f* (or the die 100*f*) through an electrical path E3 at least established in the electrical components 11*e* and 11*f*, the components 15*e* and 15*f*, and the conductive wires 12.

Figure 1D:
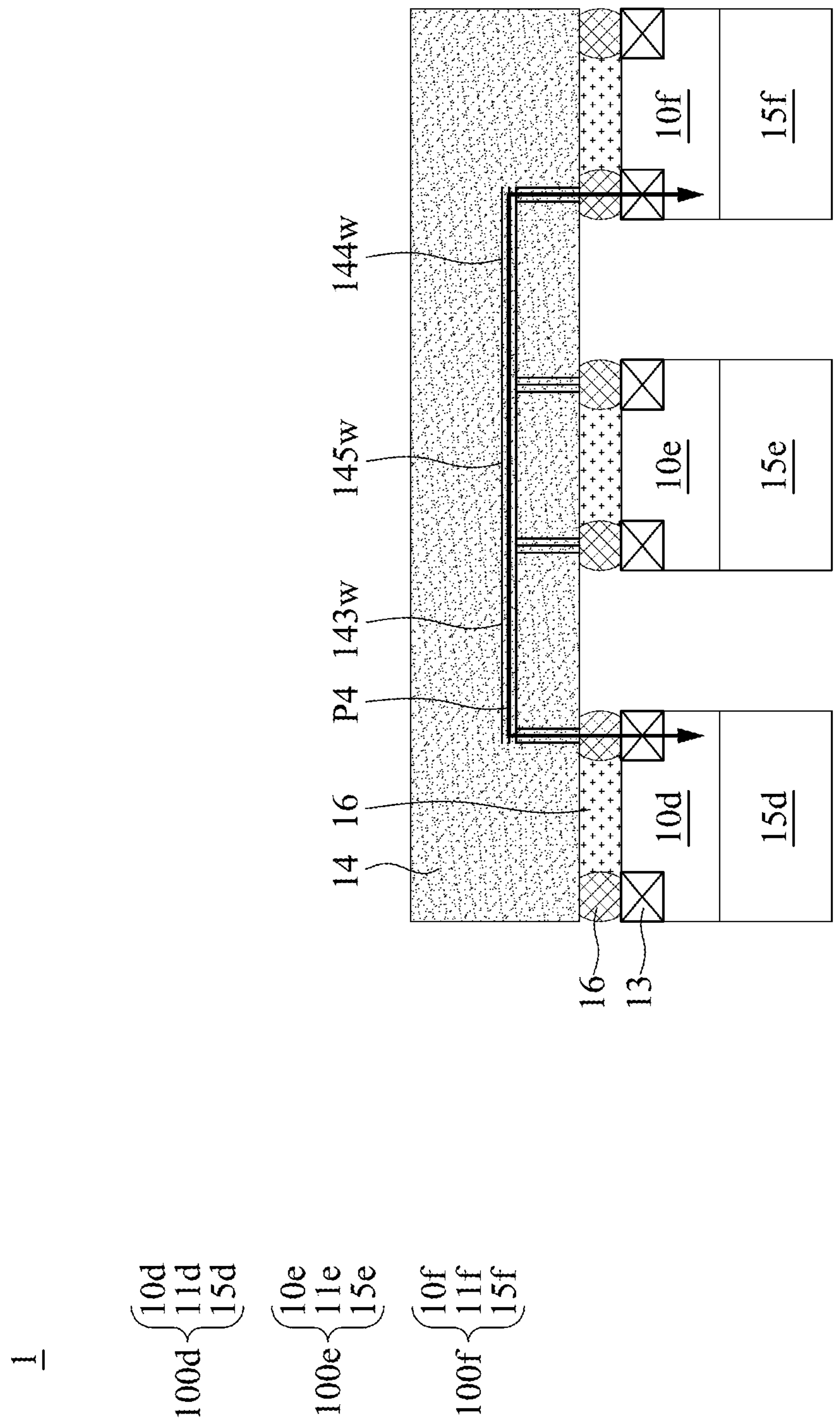
FIG. 1D is a cross section of an optical device according to some embodiments of the present disclosure.

FIG. 1D is a cross section of an optical device (e.g., the optical device 1) according to some embodiments of the present disclosure. FIG. 1D may be a cross section along the line 1D-1D' of FIG. 1.

As shown in FIG. 1D, the photonic component 10*d* (or the die 100*d*) may be configured to communicate with the photonic component 10*f* (or the die 100*f*) through an optical path P4 at least established in the I/O units 13, the connection elements 16, and the waveguides 143*w*, 144*w*, and 145*w*. The photonic component 10*d* (or the die 100*d*) may be non-adjacent to the photonic component 10*f* (or the die 100*f*).

Figure 1E:
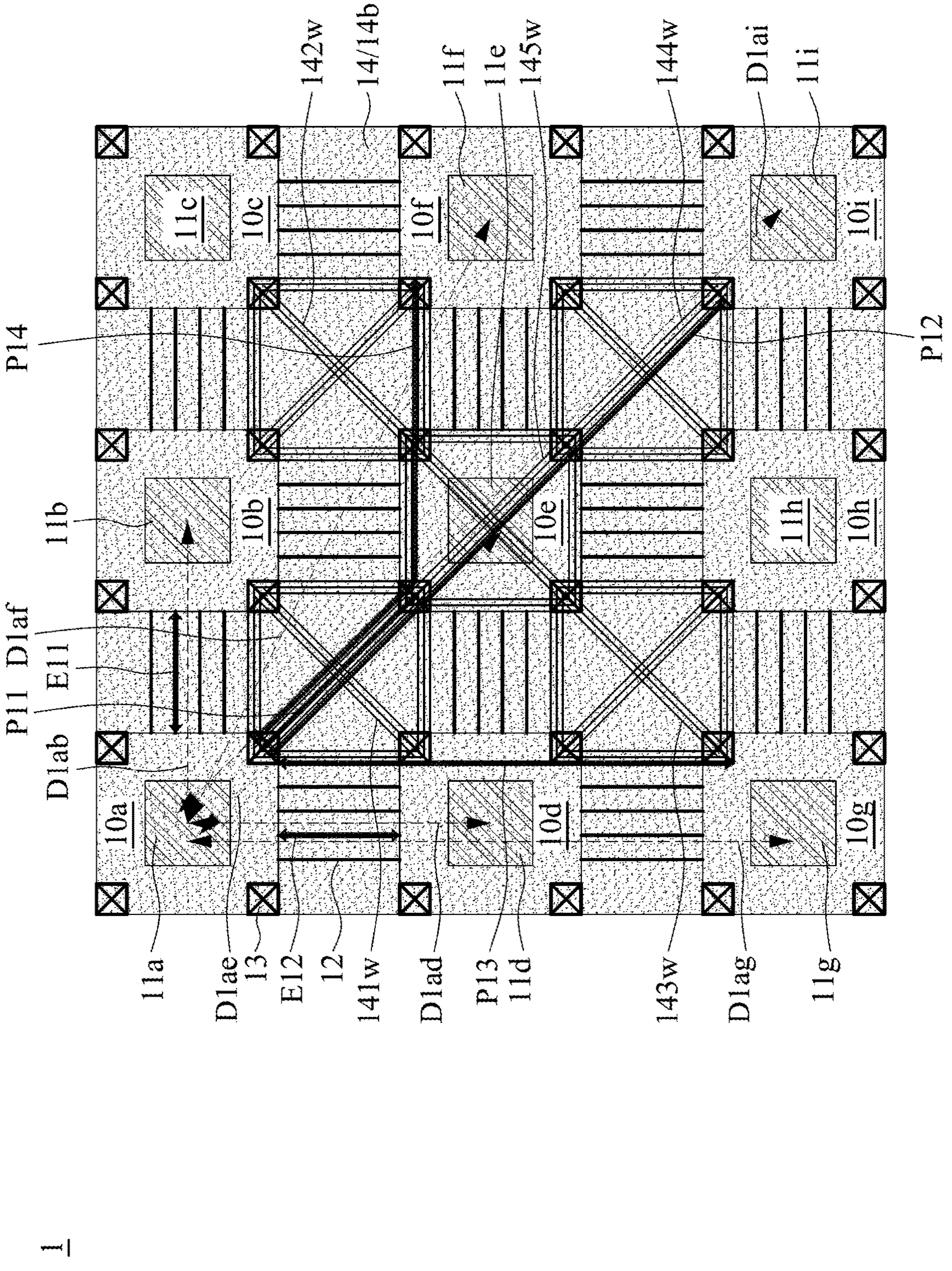
FIG. 1E is a schematic diagram of one of the states of an optical device according to some embodiments of the present disclosure.
Figure 1F:
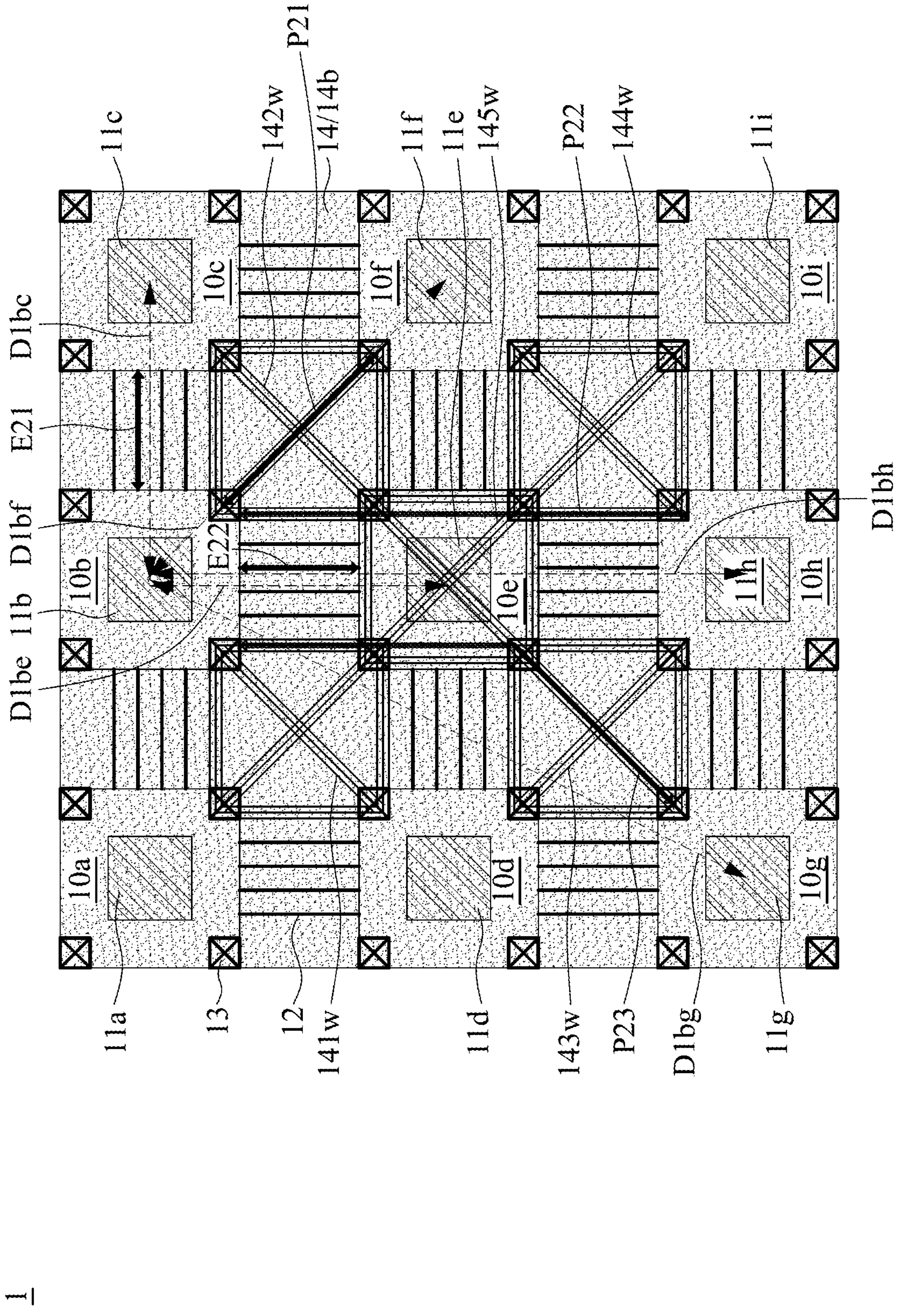
FIG. 1F is a schematic diagram of one of the states of an optical device according to some embodiments of the present disclosure.
Figure 1G:
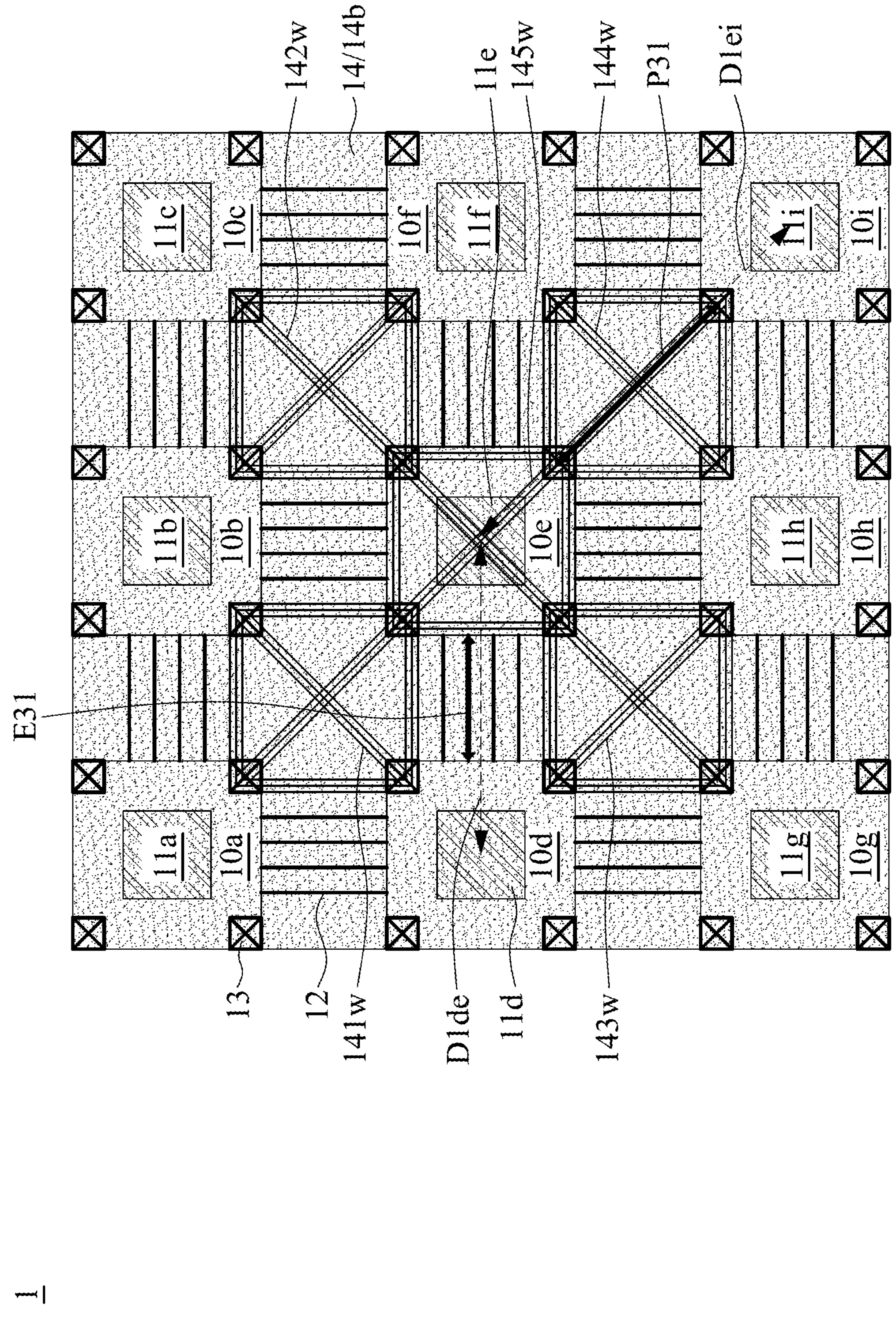
FIG. 1G is a schematic diagram of one of the states of an optical device according to some embodiments of the present disclosure.

In the present disclosure, one of the photonic components 10 may be configured to communicate with the other photonic component through an optical path or an electrical path depending on a distance between the aforesaid photonic components. In other words, one of the dies (e.g., the dies 100*a*, 100*e*, etc.) may be configured to determine whether the photonic components of the dies are communicative through an optical path or an electrical path based on the distance between the photonic components of the dies. The detailed descriptions are provided in the following FIGS. 1E, 1F, and 1G. A distance between two of the photonic components 10 may be defined by the center of one photonic component to the center of the other photonic component as illustrated in FIGS. 1E, 1F, and 1G. In some embodiments, a distance between two of the photonic components 10 may be defined by the edge of one photonic component to the edge of the other photonic component.

FIG. 1E is a schematic diagram of one of the states of an optical device (e.g., the optical device 1) according to some embodiments of the present disclosure. The photonic component (or the corner photonic component) 10*a* may be configured to communicate with the other photonic component through an optical path or an electrical path depending on a distance between the aforesaid photonic components. When a distance between the aforesaid photonic components is larger than a distance between two photonic components in the optical device, the photonic component 10*a* is configured to communicate with the other photonic component through an optical path. In particular, when a distance between the aforesaid photonic components is larger than a minimum distance between two directly adjacent photonic components in the optical device, the photonic component 10*a* is configured to communicate with the other photonic component through an optical path. When a distance between the aforesaid photonic components equals the minimum distance, the photonic component 10*a* is configured to communicate with the other photonic component through an electrical path.

The photonic component 10*a* is directly adjacent to the photonic component 10*b*. A distance D1*ab* between the photonic components 10*a* and 10*b* equals the minimum distance. The photonic component 10*a* is configured to communicate with the photonic component 10*b* through an electrical path E11, e.g., at least in the conductive wires 12. The electrical path E11 may be similar to the electrical path E1 as shown in FIG. 1C.

The photonic component 10*a* is directly adjacent to the photonic component 10*d*. A distance D1*ad* between the photonic components 10*a* and 10*d* equals the minimum distance. The photonic component 10*a* is configured to communicate with the photonic component 10*d* through an electrical path E12, e.g., at least in the conductive wires 12. The electrical path E12 may be similar to the electrical path E1 as shown in FIG. 1C.

The photonic component 10*a* is non-adjacent to the photonic component 10*e*. A distance D1*ae* between the photonic components 10*a* and 10*e* is larger than the minimum distance. In some embodiments, the distance D1*ae* between the photonic components 10*a* and 10*e* is larger than the distance D1*ab* between the photonic component 10*a* and 10*b*. The photonic component 10*a* is configured to communicate with the photonic component 10*e* through an optical path P11, e.g., at least in the waveguides 141*w*. The optical path P11 may be similar to the optical path P1 as shown in FIG. 1B. The optical path P11 may be across the photonic component 10*a* and the photonic component 10*e*. In some embodiments, the photonic component 10*a* is configured to communicate with the photonic component 10*e* through a portion of the optical path P3 and the optical path P1 (or a portion thereof).

In some embodiments, the electrical path E11 may be closer to a center of the lateral surface 10*a*1 of the photonic component 10*a* than the optical path P11 is. The optical path P11 is located adjacent to a corner of the photonic component 10*a* and the electrical path E11 is located adjacent to an edge (or the lateral surface 10*a*1) of the photonic component 10*a*.

The photonic component 10*a* is non-adjacent to the photonic component 10*i*. A distance D1*ai* between the photonic components 10*a* and 10*i* is larger than the minimum distance. The distance D1*ai* between the photonic components 10*a* and 10*i* is larger than the distance D1*ae* between the photonic components 10*a* and 10*e*. The photonic component 10*a* is configured to communicate with the photonic component 10*i* through an optical path P12, e.g., at least in the waveguides 141*w*, 144*w*, and 145*w*. The optical path P12 may be similar to the optical path P3 as shown in FIG. 1B.

The photonic component 10*a* is non-adjacent to the photonic component 10*g*. A distance D1*ag* between the photonic components 10*a* and 10*g* is larger than the minimum distance. The distance D1*ag* may be larger than the distance D1*ad* or D1*ae*. The photonic component 10*a* is configured to communicate with the photonic component 10*g* through an optical path P13, e.g., at least in the waveguides 141*w* and 143*w*. In some embodiments, the optical path P13 may be established in the waveguides 145*w* and thus the photonic component 10*a* may transmit a light to the photonic component 10*g* without optical to electrical conversion.

The photonic component 10*a* is non-adjacent to the photonic component 10*f*. A distance D1*af* between the photonic components 10*a* and 10*f* is larger than the minimum distance. The distance D1*af* may be larger than the distance D1*ae*. The photonic component 10*a* is configured to communicate with the photonic component 10*f* through an optical path P14, e.g., at least in the waveguides 141*w*, 142*w*, and 145*w*. The optical path P14 may have a part similar to the optical path P1 of FIG. 1B and a part similar to the optical path P4 of FIG. 1D.

FIG. 1F is a schematic diagram of one of the states of an optical device (e.g., the optical device 1) according to some embodiments of the present disclosure. The photonic component (or the side photonic component) 10*b* may be configured to communicate with the other photonic component through an optical path or an electrical path depending on a distance between the aforesaid photonic components. When a distance between the aforesaid photonic components is larger than a distance between two photonic components in the optical device, the photonic component 10*b* is configured to communicate with the other photonic component through an optical path. In particular, when a distance between the aforesaid photonic components is larger than the minimum distance, the photonic component 10*b* is configured to communicate with the other photonic component through an optical path. When a distance between the aforesaid photonic components equals the minimum distance, the photonic component 10*b* is configured to communicate with the other photonic component through an electrical path.

The photonic component 10*b* is directly adjacent to the photonic component 10*c*. A distance D1*bc* between the photonic components 10*b* and 10*c* equals the minimum distance. The photonic component 10*b* is configured to communicate with the photonic component 10*c* through an electrical path E21, e.g., at least in the conductive wires 12. The electrical path E21 may be similar to the electrical path E1 as shown in FIG. 1C. In some embodiments, the photonic component 10*b* is configured to communicate with the photonic component 10*a* through the electrical path E11 in FIG. 1E.

The photonic component 10*b* is directly adjacent to the photonic component 10*e*. A distance D1*be* between the photonic components 10*b* and 10*e* equals the minimum distance. The photonic component 10*a* is configured to communicate with the photonic component 10*b* through an electrical path E22, e.g., at least in the conductive wires 12. The electrical path E22 may be similar to the electrical path E1 as shown in FIG. 1C.

The photonic component 10*b* is non-adjacent to the photonic component 10*f*. A distance D1*bf* between the photonic components 10*b* and 10*f* is larger than the minimum distance. In some embodiments, the distance D1*bf* between the photonic components 10*b* and 10*f* is larger than the distance D1*bc* between the photonic component 10*b* and 10*c*. The photonic component 10*b* is configured to communicate with the photonic component 10*f* through an optical path P21, e.g., at least in the waveguides 142*w*. The optical path P21 may be similar to the optical path P1 as shown in FIG. 1B. The optical path P21 may be across the photonic component 10*b* and the photonic component 10*f*.

The photonic component 10*b* is non-adjacent to the photonic component 10*h*. A distance D1*bh* between the photonic components 10*b* and 10*h* is larger than the minimum distance. The distance D1*bh* is larger than the distance D1*be*. The photonic component 10*b* is configured to communicate with the photonic component 10*h* through an optical path P22, e.g., at least in the waveguides 142*w*, 144*w*, and 145*w*, or alternatively, at least in the waveguides 141*w*, 143*w*, and 145*w*. The optical path P22 may be similar to the optical path P4 as shown in FIG. 1D.

The photonic component 10*b* is non-adjacent to the photonic component 10*g*. A distance D1*bg* between the photonic components 10*b* and 10*g* is larger than the minimum distance. The distance D1*bg* is larger than the distance D1*be*. The photonic component 10*b* is configured to communicate with the photonic component 10*g* through an optical path P23, e.g., at least in the waveguides 141*w*, 143*w*, and 145*w*. The optical path P23 may have a part similar to the optical path P1 of FIG. 1B and a part similar to the optical path P4 of FIG. 1D.

FIG. 1G is a schematic diagram of one of the states of an optical device (e.g., the optical device 1) according to some embodiments of the present disclosure. The photonic component (or the center photonic component) 10*e* may be configured to communicate with the other photonic component through an optical path or an electrical path depending on a distance between the aforesaid photonic components. When a distance between the aforesaid photonic components is larger than a distance between two photonic components in the optical device, the photonic component 10*e* is configured to communicate with the other photonic component through an optical path. In particular, when a distance between the aforesaid photonic components is larger than a minimum distance between two directly adjacent photonic components in the optical device, the photonic component 10*e* is configured to communicate with the other photonic component through an optical path. When a distance between the aforesaid photonic components equals the minimum distance, the photonic component 10*e* is configured to communicate with the other photonic component through an electrical path.

The photonic component 10*e* is directly adjacent to the photonic component 10*d*. A distance D1*de* between the photonic components 10*d* and 10*e* equals the minimum distance. The photonic component 10*e* is configured to communicate with the photonic component 10*d* through an electrical path E31, e.g., at least in the conductive wires 12. The electrical path E31 may be similar to the electrical path E1 as shown in FIG. 1C. Similarly, the photonic component 10*e* may be configured to communicate with the photonic components 10*b*, 10*f*, and 10*h* through an electrical path, e.g., at least in the conductive wires 12.

The photonic component 10*e* is non-adjacent to the photonic component 10*i*. A distance D1*ei* between the photonic components 10*e* and 10*i* is larger than the minimum distance. In some embodiments, the distance D1*ei* between the photonic components 10*e* and 10*i* is larger than the distance D1*de* between the photonic component 10*d* and 10*e*. The photonic component 10*e* is configured to communicate with the photonic component 10*i* through an optical path P31, e.g., at least in the waveguides 144*w*. The optical path P31 may be similar to the optical path P2 as shown in FIG. 1B. In some embodiments, the photonic component 10*i* is configured to communicate with the photonic component 10*e* through a portion of the optical path P3 and the optical path P2 (or a portion thereof). The optical path P21 may be across the photonic component 10*e* and the photonic component 10*i* without overlapping the optical path P11 of FIG. 1E. Similarly, the photonic component 10*e* may be configured to communicate with the photonic components 10*a*, 10*c*, and 10*g* through an optical path, e.g., at least in the optical interposer 14.

According to the relevant descriptions of FIGS. 1E, 1F, and 1G, in the case that one of the photonic components 10 is directly adjacent to another of the photonic components 10, the one photonic component is configured to communicate with the other photonic component through an electrical path. For example, the photonic component 10*a* is configured to communicate with the photonic component 10*b* through the electrical path E11; the photonic component 10*b* is configured to communicate with the photonic component 10*e* through the electrical path E22. In the case that one of the photonic components 10 is non-adjacent to another of the photonic components 10, the one photonic component is configured to communicate with the other photonic component. For example, the photonic component 10*a* is configured to communicate with the photonic component 10*e* through the optical path P11; the photonic component 10*a* is configured to communicate with the photonic component 10*i* through the optical path P12; the photonic component 10*e* is configured to communicate with the photonic component 10*i* through the optical path P31. The photonic component 10*e* is disposed between the photonic components 10*a* and 10*i*. In some embodiments, the optical path P12 may be configured to connect the optical path P11 with the optical path P31. The optical path P12 may be across the optical path P11 and the optical path P31.

Based on the distance between the photonic components 10 (or the associated dies), the photonic components 10 may be configured to communicate with other photonic components of the optical device 1 through an electrical path or an optical path. The dies may be configured to compare the distances between the photonic components 10 or a distance between two photonic components 10 and the minimum distance, e.g., by a comparator. The directly adjacent photonic components 10 (the distance equals the minimum distance) are configured to communicate with each other through the conductive wires (i.e., the electrical path) with a relatively high bandwidth. The non-adjacent photonic components 10 (the distance larger than at least one of the other distance or the minimum distance) are configured to communicate with each other through the optical interposer 14 (i.e., the optical path) which has a relatively low power loss. Furthermore, having the optical path and the electrical path in the optical device 1 increases the overall transmission bandwidth among the photonic components.

Figure 2:
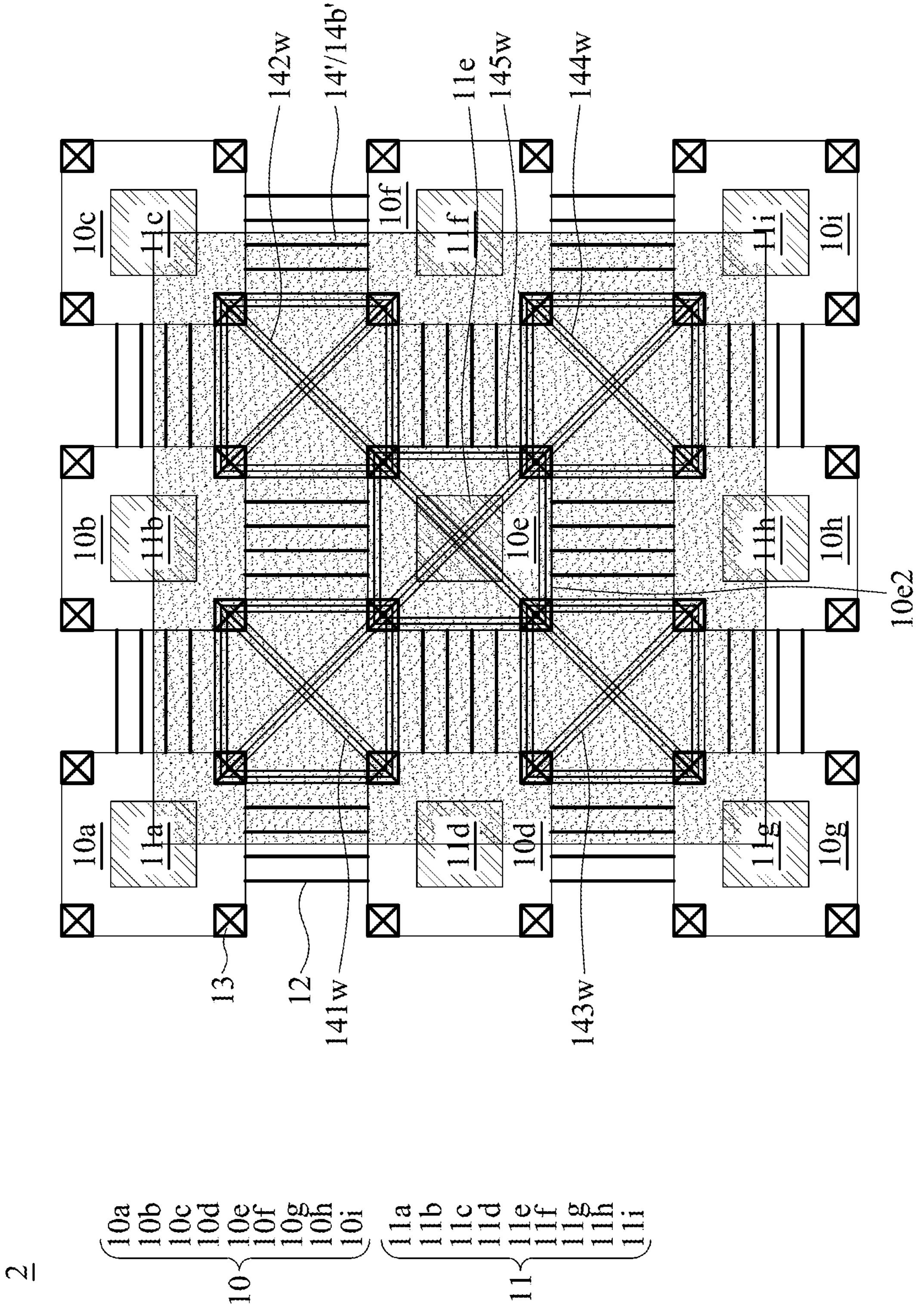
FIG. 2 is a top view of an optical device according to some embodiments of the present disclosure.

FIG. 2 is a top view of an optical device 2 according to some embodiments of the present disclosure. The optical device 2 in FIG. 2 is similar to the optical device 1 in FIG. 1. Therefore, some detailed descriptions may refer to corresponding preceding paragraphs and are not repeated hereinafter for conciseness, with differences therebetween as follows.

The optical device 2 may include an optical interposer 14'. The optical interposer 14' may be similar to the optical interposer 14 of the optical device 1, except that a body portion 14*b*' of the optical interposer 14' partially covers the array of the photonic components 10. That is, a portion of the corner photonic components 10*a*, 10*c*, 10*g*, 10*i* and a portion of the side photonic components 10*b*, 10*d*, 10*f*, 10*h* are exposed by the optical interposer 14'.

Figure 2A:
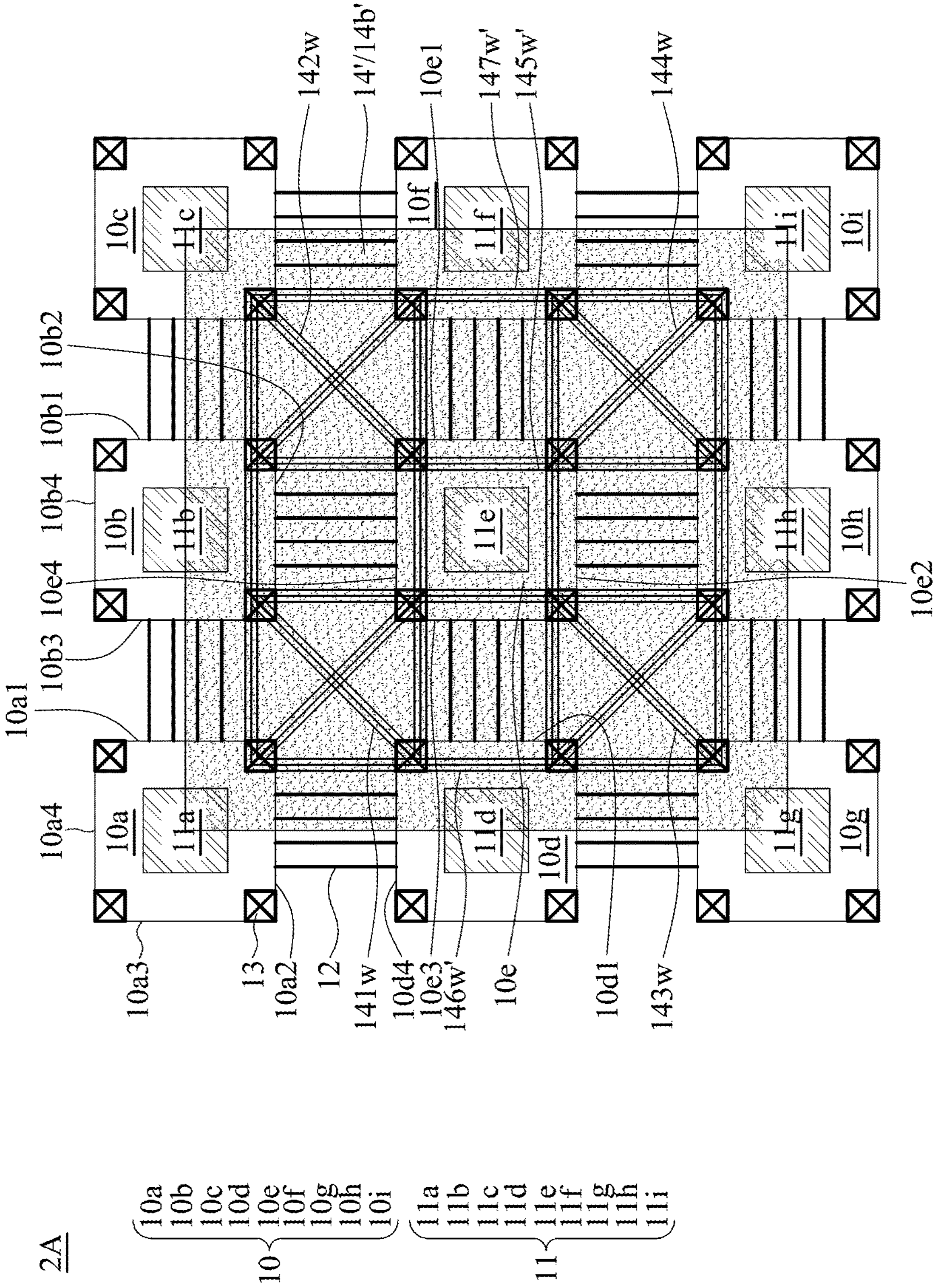
FIG. 2A is a top view of an optical device according to some embodiments of the present disclosure.

FIG. 2A is a top view of an optical device 2A according to some embodiments of the present disclosure. The optical device 2A in FIG. 2A is similar to the optical device 2 in FIG. 2. Therefore, some detailed descriptions may refer to corresponding preceding paragraphs and are not repeated hereinafter for conciseness, with differences therebetween as follows.

The optical interposer 14' includes waveguides 145*w'* having different patterns than the waveguides 145*w* of FIG. 2. The waveguides 145*w'* may have two sets of waveguides extending along the lateral surface 10*e*1 and two sets of waveguides extending along the lateral surface 10*e*2. The optical interposer 14' includes waveguides 146*w'* disposed over the photonic component 10*d* and waveguides 147*w'* disposed over the photonic component 10*f*. The waveguides 146*w'* may be optically coupled to the waveguides 141*w* and 143*w*. The waveguides 147*w'* may be optically coupled to the waveguides 142*w* and 144*w*.

Figure 2B:
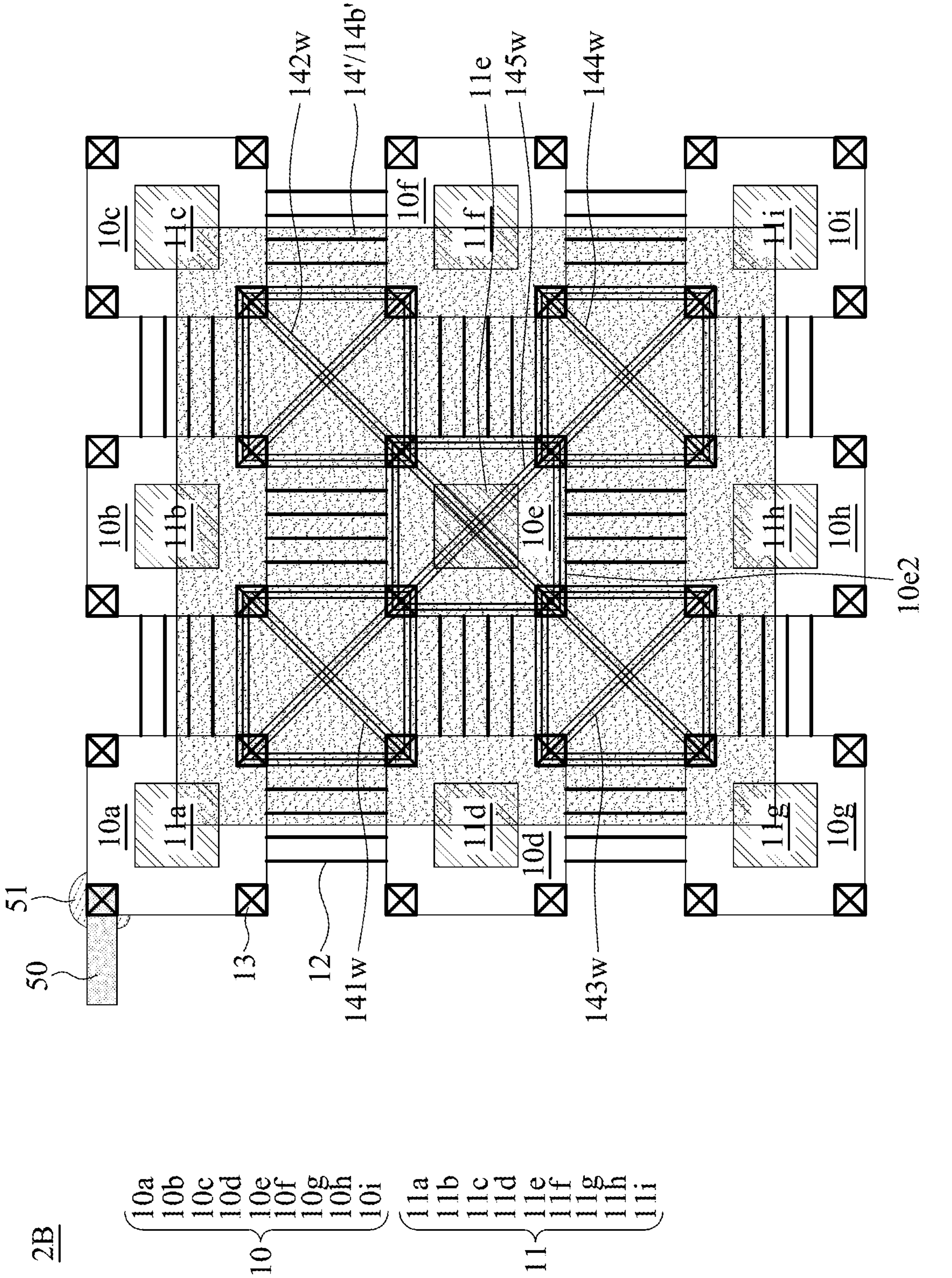
FIG. 2B is a top view of an optical device according to some embodiments of the present disclosure.

FIG. 2B is a top view of an optical device 2B according to some embodiments of the present disclosure. The optical device 2B in FIG. 2B is similar to the optical device 2 in FIG. 2. Therefore, some detailed descriptions may refer to corresponding preceding paragraphs and are not repeated hereinafter for conciseness, with differences therebetween as follows.

The optical device 2B may include an optical component 50. The optical component 50 may be or include a fiber array unit (FAU) including a plurality of optical fibers. The optical component 50 may be connected or attached to one of the I/O units 13 of the photonic component 10*a* by an adhesive material (or protective material) 51. As shown in FIG. 2B, the left-top I/O unit 13 of the photonic component 10*a* may be connected or attached to the optical component 50. The photonic component 10*a* may be optically coupled to the optical component 50 and the optical interposer 14' through different I/O units 13, that is, different optical regions. For example, the optical component 50 may be optically coupled with the left-top I/O unit 13 of the photonic component 10*a*. The optical interposer 14' may be optically coupled with the right-bottom I/O unit 13, different from the left-top I/O unit 13. The optical component 50 may be configured to transmit a light with a wavelength different from that of the light transmitted in the optical interposer 14' of the optical device 2B.

In some embodiments, the optical component 50 may be connected or attached to other I/O units 13 of the photonic component 10*a*, such as, the left-bottom I/O unit 13 or the right-top I/O unit 13. In some embodiments, the optical component 50 may be connected or attached to the I/O units 13 of the other photonic components 10*b*, 10*c*, 10*d*, 10*f*, 10*g*, 10*h*, and 10*i*. In some embodiments, the optical device 2B may include a plurality of optical components 50 connected to the photonic components.

The adhesive material (or protective material) 51 may encapsulate a coupling end of the optical component 50. The adhesive material (or protective material) 51 may include epoxy or other another suitable polymeric material.

Figure 3:
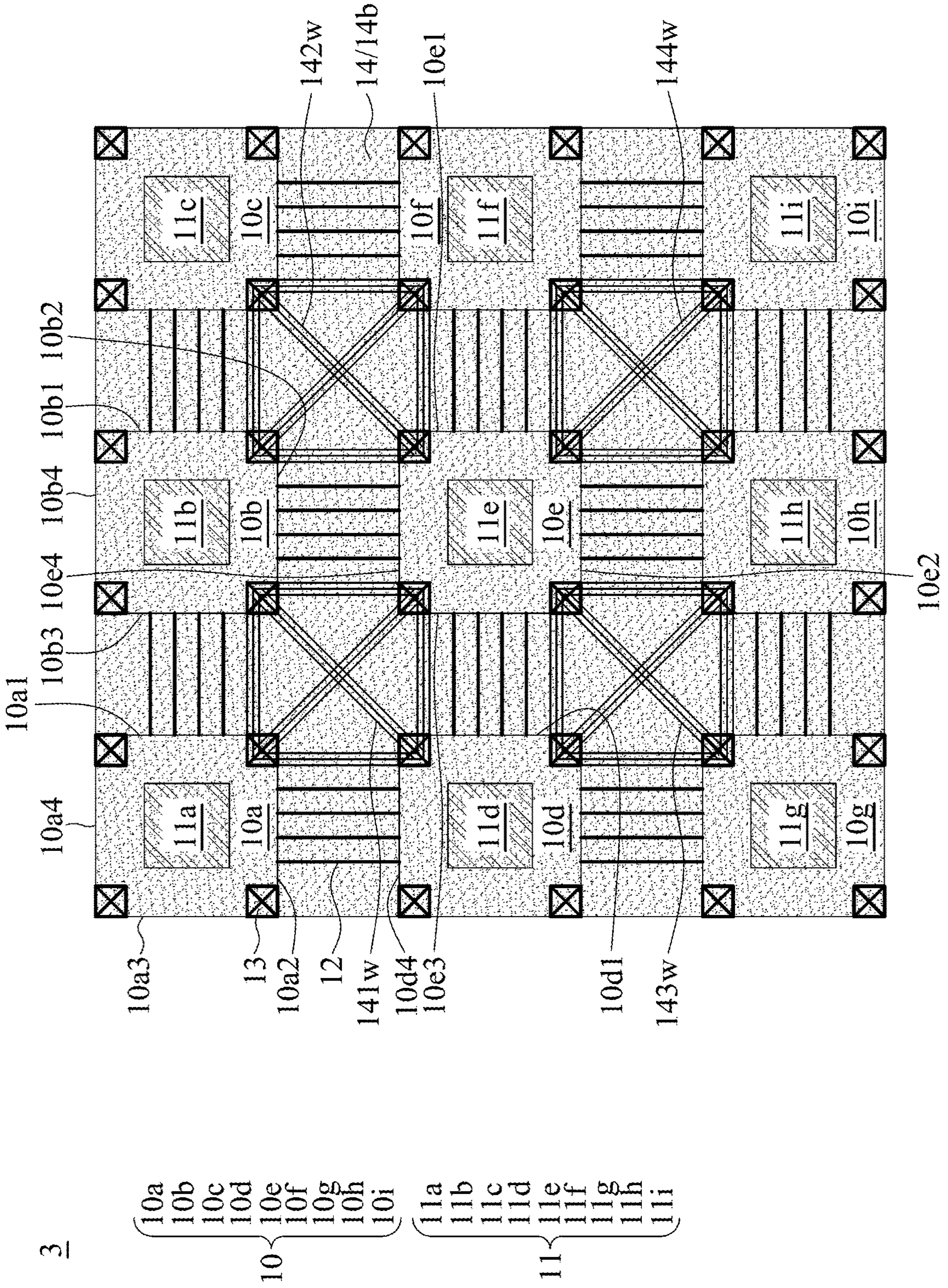
FIG. 3 is a top view of an optical device according to some embodiments of the present disclosure.

FIG. 3 is a top view of an optical device according to some embodiments of the present disclosure. The optical device 3 in FIG. 3 is similar to the optical device 1 in FIG. 1. Therefore, some detailed descriptions may refer to corresponding preceding paragraphs and are not repeated hereinafter for conciseness, with differences therebetween as follows.

The optical interposer 14 of the optical device 3 does not include the waveguide 145*w* of FIG. 1. Therefore, the non-adjacent photonic components 10*a* and 10*i* may communicate with each other through the waveguides 141*w*, a circuit layer and an electro-optic conversion unit of the photonic component 10*e*, and the waveguides 144*w*. That is, the non-adjacent photonic components 10*a* and 10*i* may communicate with each other with at least one optical to electrical conversion.

Figure 4:
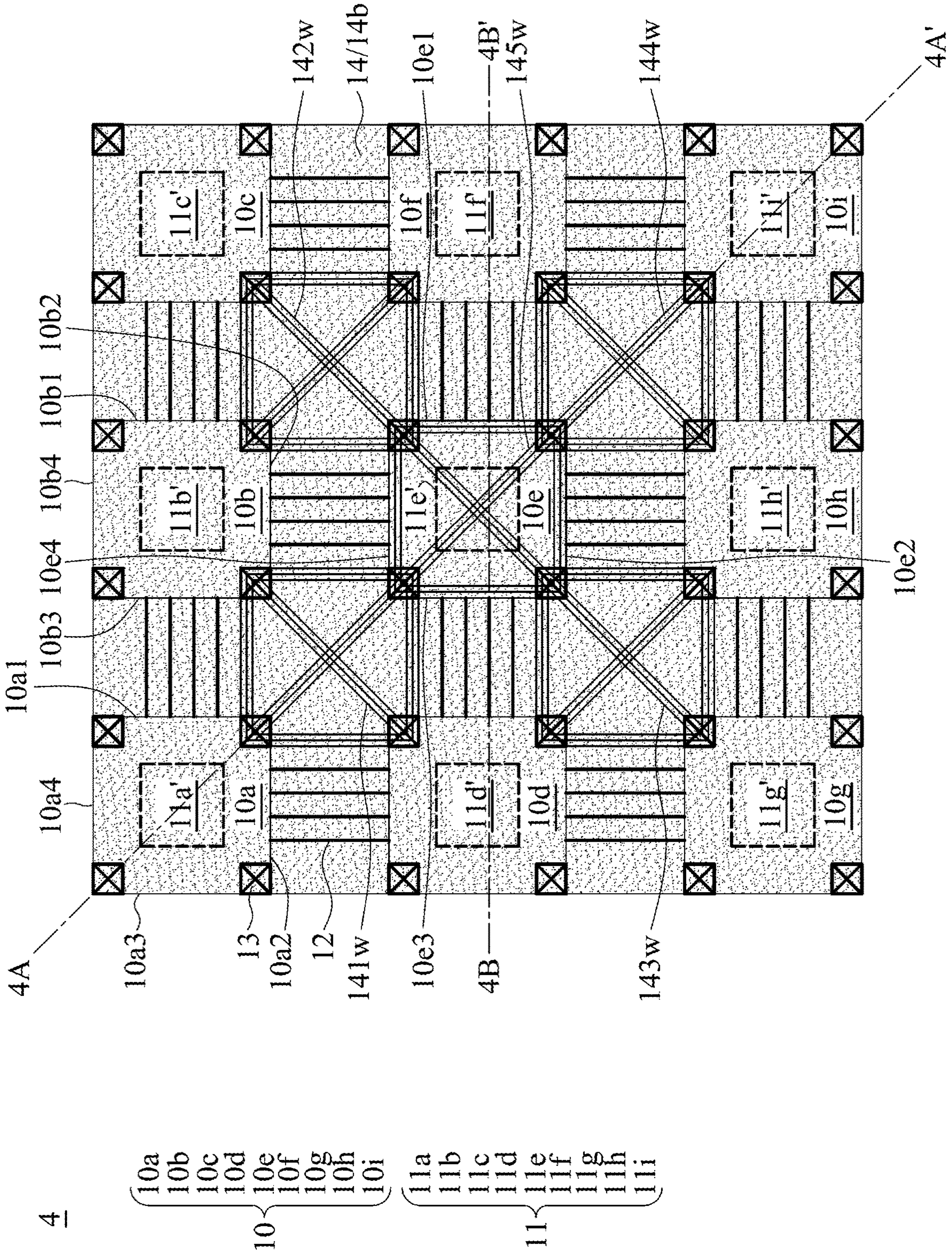
FIG. 4 is a top view of an optical device according to some embodiments of the present disclosure.
Figure 4A:
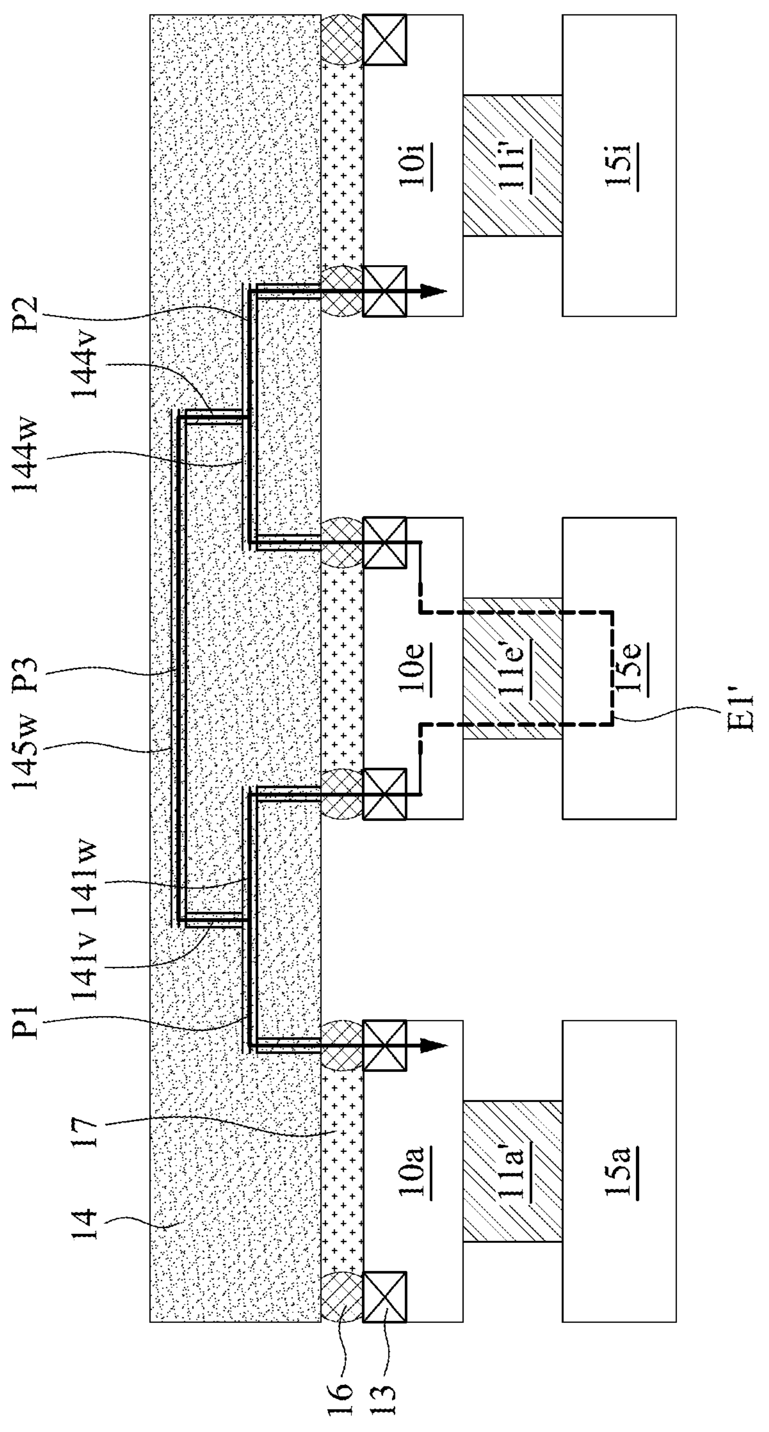
FIG. 4A is a cross section of an optical device according to some embodiments of the present disclosure.
Figure 4B:
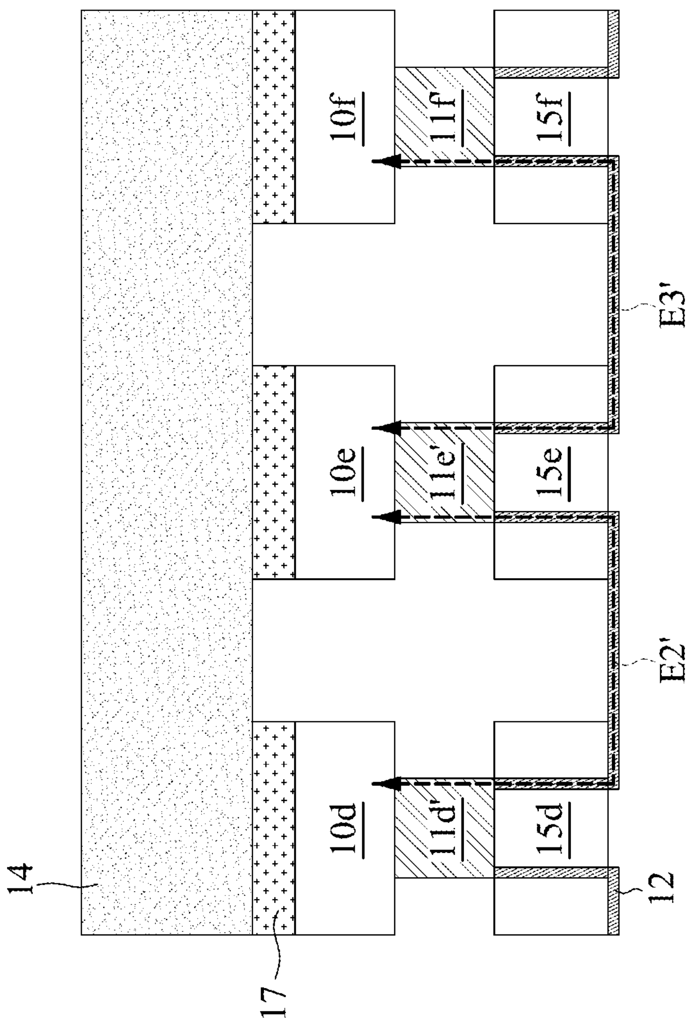
FIG. 4B is a cross section of an optical device according to some embodiments of the present disclosure.

FIG. 4 is a top view of an optical device 4 according to some embodiments of the present disclosure. FIG. 4A is a cross section of an optical device 4 according to some embodiments of the present disclosure. FIG. 4A may be a cross section along the line 4A-4A' of FIG. 4. FIG. 4B is a cross section of an optical device 4 according to some embodiments of the present disclosure. FIG. 4B may be a cross section along the line 4B-4B' of FIG. 4. The optical device 4 in FIGS. 4, 4A, and 4B is similar to the optical device 1 in FIGS. 1, 1B, and 1C. Therefore, some detailed descriptions may refer to corresponding preceding paragraphs and are not repeated hereinafter for conciseness, with differences therebetween as follows.

The optical device 4 may include a plurality of the electrical components 11'. The electrical components 11' may include electrical components 11*a'*, 11*b'*, 11*c'*, 11*d'*, 11*e'*, 11*f'*, 11*g'*, 11*h'*, and 11*i'*. Each of the electrical components 11' may be configured to communicate with the corresponding photonic component. Each of the electrical components 11' may be electrically connected to the corresponding photonic component. Each of the electrical components 11' may be disposed below the corresponding one of the photonic components 10. In FIG. 4, the electrical components 11' are depicted with dashed lines to indicate that they are disposed below the photonic components 10. Each of the electrical components 11' may include a passive component, such as a resistor, or an active component, such as an amplifier. The electrical components 11' may be configured to modulate or amplify the signals from the photonic components 10.

In FIG. 4A, the electrical component 11*a'* is disposed between the photonic component 10*a* and the component 15*a*. The electrical component 11*e'* is disposed between the photonic component 10*e* and the component 15*e*. The electrical component 11*i'* is disposed between the photonic component 10*i* and the component 15*i*. The photonic component 10*a* (or the die 100*a*) may be configured to communicate with the photonic component 10*i* (or the die 100*i*) through the optical path P1 of FIG. 1B, an electrical path E1', and the optical path P2 of FIG. 1B. The electrical path E1' may be at least established in the circuit layers in the photonic component 10*e*, the electrical component 11*e'*, and the component 15*e*. The electro-optic conversion unit (not shown) of the photonic component 10*e* may be configured to convert an optical signal from the optical path P1 into an electrical signal and transmit it into the electrical path E1'. As such, the photonic component 10*a* may be configured to directly transmit a light to the photonic component 10*i* with at least one optical to electrical conversion.

In FIG. 4B, the electrical component 11*d'* is disposed between the photonic component 10*d* and the component 15*d*. The electrical component 11*d'* is disposed between the photonic component 10*d* and the component 15*d*. The photonic component 10*d* (or the die 100*d*) may be configured to communicate with the directly adjacent photonic component 10*e* (or the die 100*e*) through an electrical path E2' at least established in the electrical components 11*d'* and 11*e'*, the components 15*d* and 15*e*, and the conductive wires 12. Similarly, the photonic component 10*e* (or the die 100*e*) may be configured to communicate with the directly adjacent photonic component 10*f* (or the die 100*f*) through an electrical path E3' at least established in the electrical components 11*e*' and 11*f*', the components 15*e* and 15*f*, and the conductive wires 12.

Figure 5:
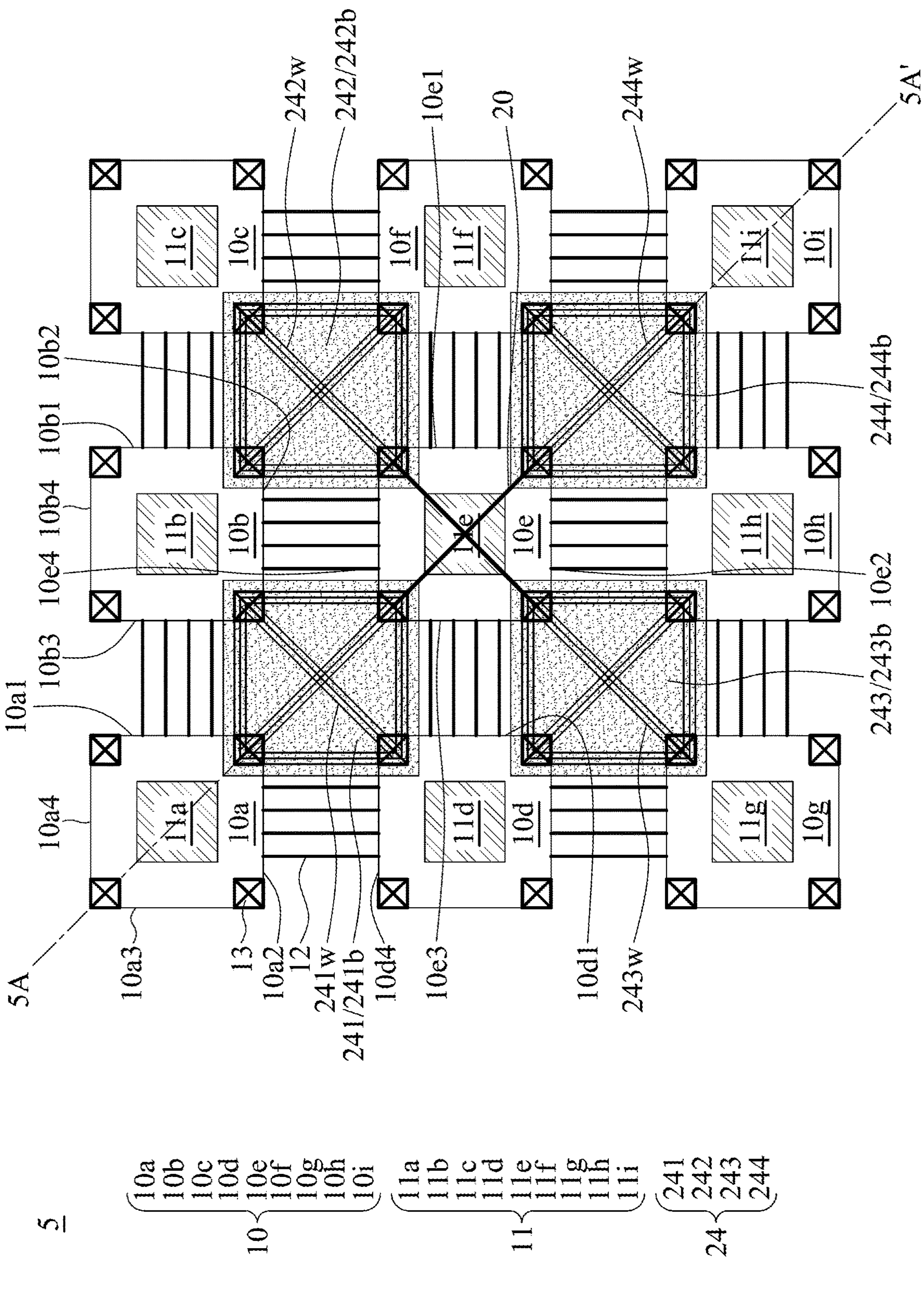
FIG. 5 is a top view of an optical device according to some embodiments of the present disclosure.

FIG. 5 is a top view of an optical device 5 according to some embodiments of the present disclosure. The optical device 5 in FIG. 5 is similar to the optical device 1 in FIG. 1. Therefore, some detailed descriptions may refer to corresponding preceding paragraphs and are not repeated hereinafter for conciseness, with differences therebetween as follows.

The optical device 5 may include a plurality of optical interposers 24 disposed over the photonic components 10. The optical interposers 24 may include optical interposers 241, 242, 243, and 244, respectively including body portions 241*b*, 242*b*, 243*b*, and 243*d* and waveguides 241*w*, 242*w*, 243*w*, and 244*w* embedded therein. The optical interposers 241, 242, 243, and 244 are physically separated from each other. The optical interposer 24 may leave room for accommodating other electrical interposers over the photonic components 30.

The waveguides 241*w*, 242*w*, 243*w*, and 244*w* may optically couple to the I/O units 13. The optical interposers 241, 242, 243, and 244 (or the waveguides 241*w*, 242*w*, 243*w*, and 244*w*) may be disposed between the corner photonic component and the center photonic component 10*e*. For example, the optical interposer 241 (or the waveguide 241*w*) may be disposed between the photonic components 10*a* and 10*e*. The waveguides 241*w*, 242*w*, 243*w*, and 244*w* may each include at least one waveguide extending diagonally between two non-adjacent photonic components and at least one waveguide extending perpendicularly between two directly adjacent photonic components.

The optical interposers 24 may partially define an optical path between two non-adjacent photonic components 10. For example, the optical interposer 241 including the waveguides 241*w* may define an optical path between the non-adjacent photonic components 10*a* and 10*e*. The optical interposer 244 including the waveguides 244*w* may define an optical path between the non-adjacent photonic components 10*e* and 10*i*. The optical interposers 241 and 242 including the waveguides 241*w* and 242*w* may define an optical path between the non-adjacent photonic components 10*a* and 10*c*.

The optical device 5 may include a plurality of optical wires (or fibers) 20 disposed over the photonic component 10*e*. The optical wires 20 may optically couple to the optical interposers 241, 242, 243, and 244. The waveguides 241*w*, 242*w*, 243*w*, and 244*w* may optically couple to each other through the optical wires 20. The optical interposers 24 and the optical wires 20 may collectively function as a bridge unit optically coupling to the photonic components 10. For example, the optical wires 20 and at least one of the waveguides 241*w*-244*w* may optically couple to two photonic components (e.g., 10*a* and 10*i* or 10*a* and 10*f*, etc.) spaced apart from each other by one photonic component (e.g., 10*e*). The waveguides 241*w*, 242*w*, 243*w*, and 244*w* have a relatively low power loss during the signal transmission compared to the conductive wires 12. The optical wires 20 have a relatively low power loss during the signal transmission compared to the conductive wires 12.

The optical wires 20 may be made of photoresist material. The optical wires 20 may each include a core with a first refractive index and a cladding layer with a second refractive index different from the first refractive index. The second refractive index may be lower than the first refractive index.

Figure 5A:
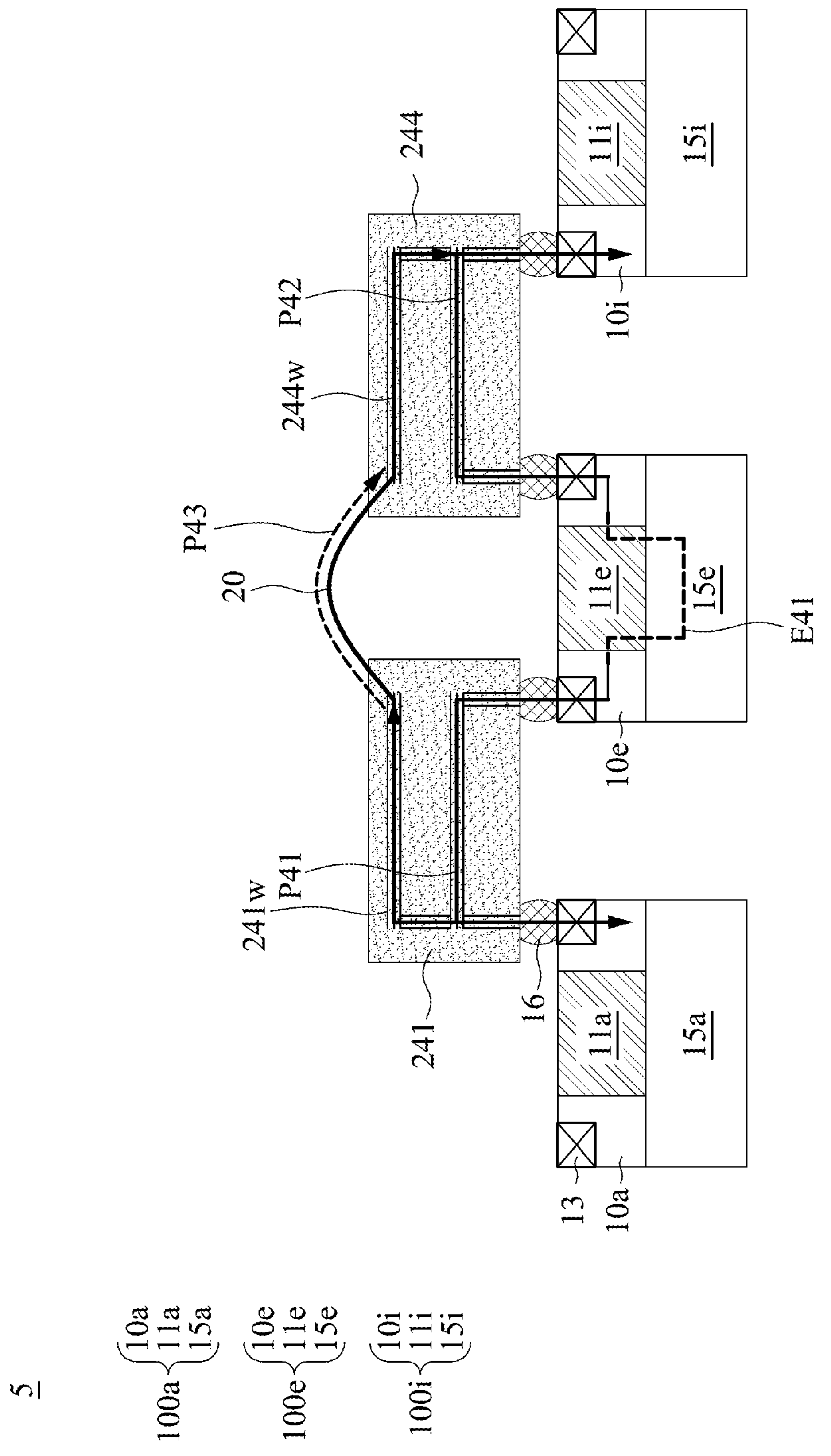
FIG. 5A is a cross section of an optical device according to some embodiments of the present disclosure.

FIG. 5A is a cross section of an optical device 5 according to some embodiments of the present disclosure. FIG. 5A may be a cross section along the line 5A-5A' of FIG. 5.

As shown in FIG. 5A, the photonic component 10*a* (or the die 100*a*) may be configured to communicate with the photonic component 10*e* (or the die 100*e*) through an optical path P41 at least established in the I/O units 13, the connection elements 16, and the waveguides 241*w*. The photonic component 10*a* (or the die 100*a*) may be non-adjacent to the photonic component 10*e* (or the die 100*e*). The photonic component 10*e* (or the die 100*e*) may be configured to communicate with the photonic component 10*i* (or the die 100*i*) through an optical path P42 at least established in the I/O units 13, the connection elements 16, and the waveguides 244*w*. The photonic component 10*e* (or the die 100*e*) may be non-adjacent to the photonic component 10*i* (or the die 100*i*).

The photonic component 10*a* (or the die 100*a*) may be non-adjacent to the photonic component 10*i* (or the die 100*i*). The photonic component 10*a* (or the die 100*a*) may be configured to communicate with the photonic component 10*i* (or the die 100*i*) through an optical path P43 at least established in the I/O units 13, the connection elements 16, the waveguides 241*w* and 244*w*, and the optical wires 20. As such, the photonic component 10*a* may be configured to directly transmit a light to the photonic component 10*i* without an optical to electrical conversion. The optical path P43 may be configured to connect the optical path P41 with the optical path P42. In some embodiments, the optical path P43 may be across the optical path P41 and the optical path P42.

The optical wires 20 may be disposed over the optical interposers 241 and 244. The optical wires 20 may be connected to the waveguides 241*w* of the optical interposer 241 and 244*w* of the optical interposer 244. The waveguides 241*w* may include an upper waveguide optically coupled to the optical wires 20 and a lower waveguide under the upper waveguide. Similarly, an upper waveguide of the waveguide 244*w* may be optically coupled to the optical wires 20.

In some embodiments, the center photonic component 10*e* may be configured to process the optical signal from the photonic component 10*a* before it is transmitted to the photonic component 10*i*. In this case, the photonic component 10*a* (or the die 100*a*) may be configured to communicate with the photonic component 10*i* (or the die 100*i*) through the optical path P41, an electrical path E41, and the optical path P42. The electrical path E41 may be at least established in the circuit layers in the photonic component 10*e*, the electrical component 11*e*, and the component 15*e*. The electro-optic conversion unit (not shown) of the photonic component 10*e* may be configured to convert an optical signal from the optical path P41 into an electrical signal and transmit it into the electrical path E41. As such, the photonic component 10*a* may be configured to directly transmit a light to the photonic component 10*i* with at least one optical to electrical conversion.

Based on the distance between the photonic components 10 (or the associated dies), the photonic components 10 may be configured to communicate with other photonic components of the optical device 5 through an electrical path or an optical path. The dies may be configured to compare the distances between the photonic components 10 or a distance between two photonic components 10 and the minimum distance, e.g., by a comparator. The directly adjacent photonic components 10 (the distance equals the minimum distance) are configured to communicate with each other through the conductive wires (i.e., the electrical path) with a relatively high bandwidth. The non-adjacent photonic components 10 (the distance larger than at least one of the other distance or the minimum distance) are configured to communicate with each other through the optical interposers 24 and the optical wires 20 (i.e., the optical path) which have a relatively low power loss. Furthermore, having the optical path and the electrical path in the optical device 5 increases the overall transmission bandwidth among the photonic components.

Figure 6:
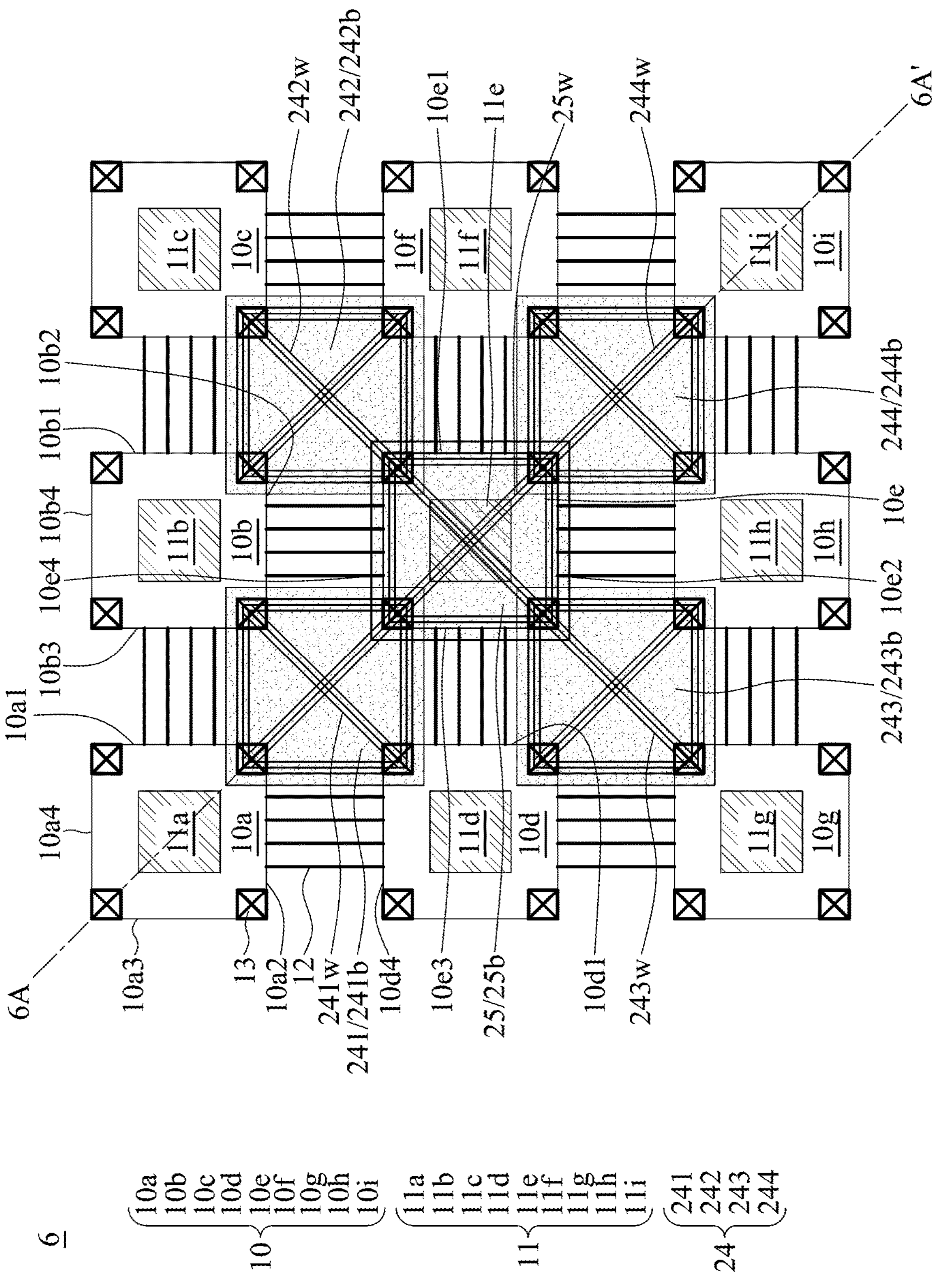
FIG. 6 is a top view of an optical device according to some embodiments of the present disclosure.

FIG. 6 is a top view of an optical device according to some embodiments of the present disclosure. The optical device 6 in FIG. 6 is similar to the optical device 5 in FIG. 5. Therefore, some detailed descriptions may refer to corresponding preceding paragraphs and are not repeated hereinafter for conciseness, with differences therebetween as follows.

The optical device 6 may include an optical interposer 25 disposed over the optical interposers 24 and the photonic component 10*e*, rather than the optical wires 20. The optical interposer 25 may include a body portion 25*b* and a plurality of waveguides 25*w* embedded therein. The waveguides 25*w* may include at least one waveguide extending diagonal to the photonic component 10*e* and at least one waveguide extending perpendicular to the lateral surface 10*e*1 or 10*e*2 of the photonic component 10*e*.

The optical interposer 25 may connect the optical interposers 241, 242, 243, and 244. The waveguides 25*w* of the optical interposer 25 may optically couple to the optical interposers 241, 242, 243, and 244. The waveguides 241*w*, 242*w*, 243*w*, and 244*w* may optically couple to each other through the waveguides 25*w* of the optical interposer 25. The optical interposers 24 and the optical interposer 25 may collectively function as a bridge unit optically coupling to the photonic components 10. For example, the waveguides 25*w* of the optical interposer 25 and at least one of the waveguides 241*w*-244*w* may optically couple to two photonic components (e.g., 10*a* and 10*i* or 10*a* and 10*f*, etc.) spaced apart from each other by one photonic component (e.g., 10*e*). The waveguides 241*w*, 242*w*, 243*w*, and 244*w* have a relatively low power loss during the signal transmission compared to the conductive wires 12. The waveguides 25*w* have a relatively low power loss during the signal transmission compared to the conductive wires 12.

Figure 6A:
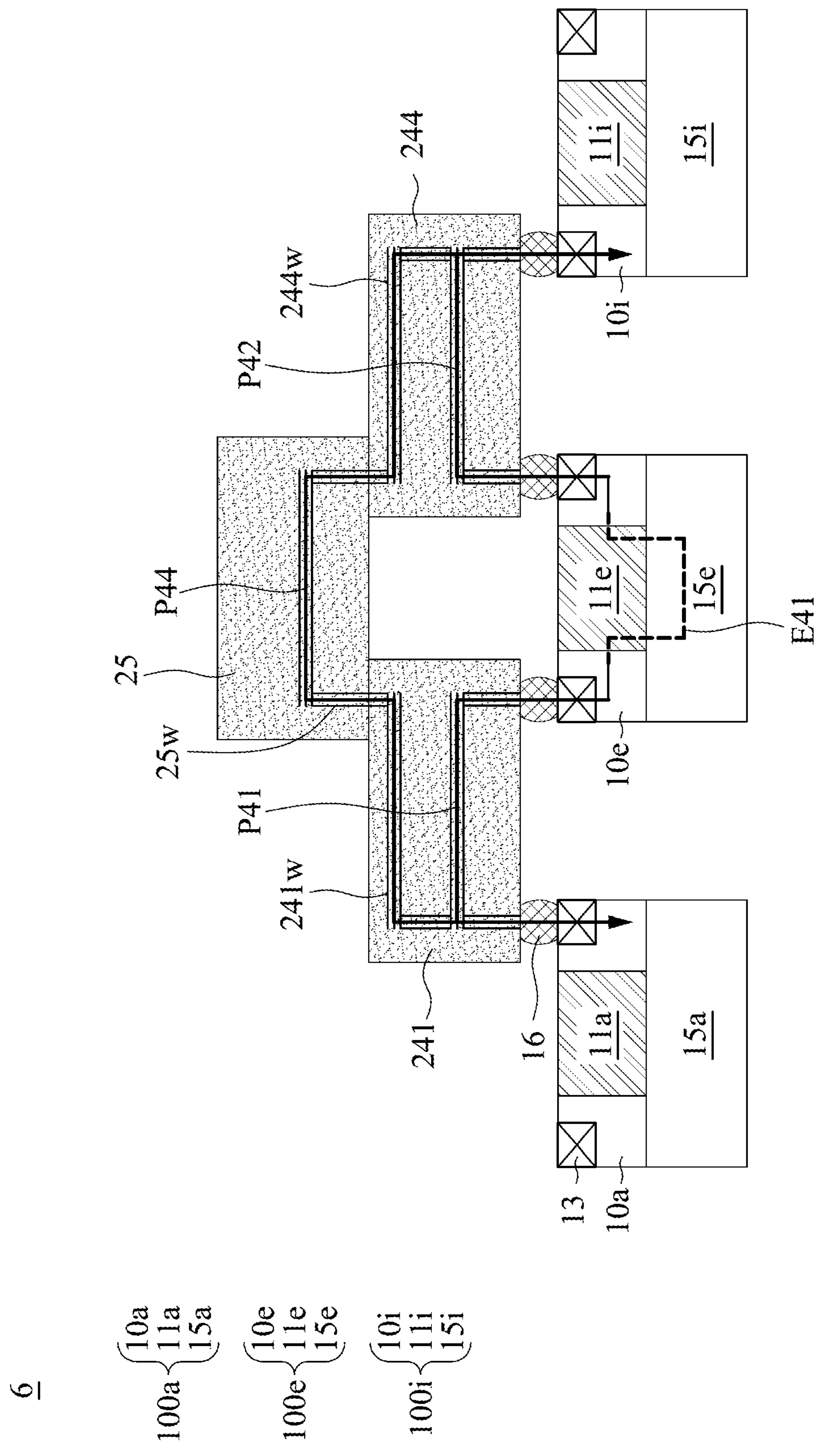
FIG. 6A is a cross section of an optical device according to some embodiments of the present disclosure.

FIG. 6A is a cross section of an optical device according to some embodiments of the present disclosure. FIG. 6A may be a cross section along the line 6A-6A' of FIG. 6.

The photonic component 10*a* (or the die 100*a*) may be non-adjacent to the photonic component 10*i* (or the die 100*i*). The photonic component 10*a* (or the die 100*a*) may be configured to communicate with the photonic component 10*i* (or the die 100*i*) through an optical path P44 at least established in the I/O units 13, the connection elements 16, the waveguides 241*w* and 244*w*, and the waveguides 25*w* of the optical interposer 25. As such, the photonic component 10*a* may be configured to directly transmit a light to the photonic component 10*i* without an optical to electrical conversion. The optical path P44 may be configured to connect the optical path P41 with the optical path P42. In some embodiments, the optical path P44 may be across the optical path P41 and the optical path P42.

The optical interposer 25 may be disposed over the optical interposers 241 and 244. The waveguides 25*w* of the optical interposer 25 may be connected to the waveguides 241*w* of the optical interposer 241 and 244*w* of the optical interposer 244. The waveguides 241*w* may include an upper waveguide optically coupled to the waveguides 25*w* of the optical interposer 25 and a lower waveguide under the upper waveguide. Similarly, an upper waveguide of the waveguide 244*w* may be optically coupled to the waveguides 25*w* of the optical interposer 25.

Based on the distance between the photonic components 10 (or the associated dies), the photonic components 10 may be configured to communicate with other photonic components of the optical device 6 through an electrical path or an optical path. The dies may be configured to compare the distances between the photonic components 10 or a distance between two photonic components 10 and the minimum distance, e.g., by a comparator. The directly adjacent photonic components 10 (the distance equals the minimum distance) are configured to communicate with each other through the conductive wires (i.e., the electrical path) with a relatively high bandwidth. The non-adjacent photonic components 10 (the distance larger than at least one of the other distance or the minimum distance) are configured to communicate with each other through the optical interposers 24 and the optical interposer 25 (i.e., the optical path) which have a relatively low power loss. Furthermore, having the optical path and the electrical path in the optical device 6 increases the overall transmission bandwidth among the photonic components.

Figure 7:
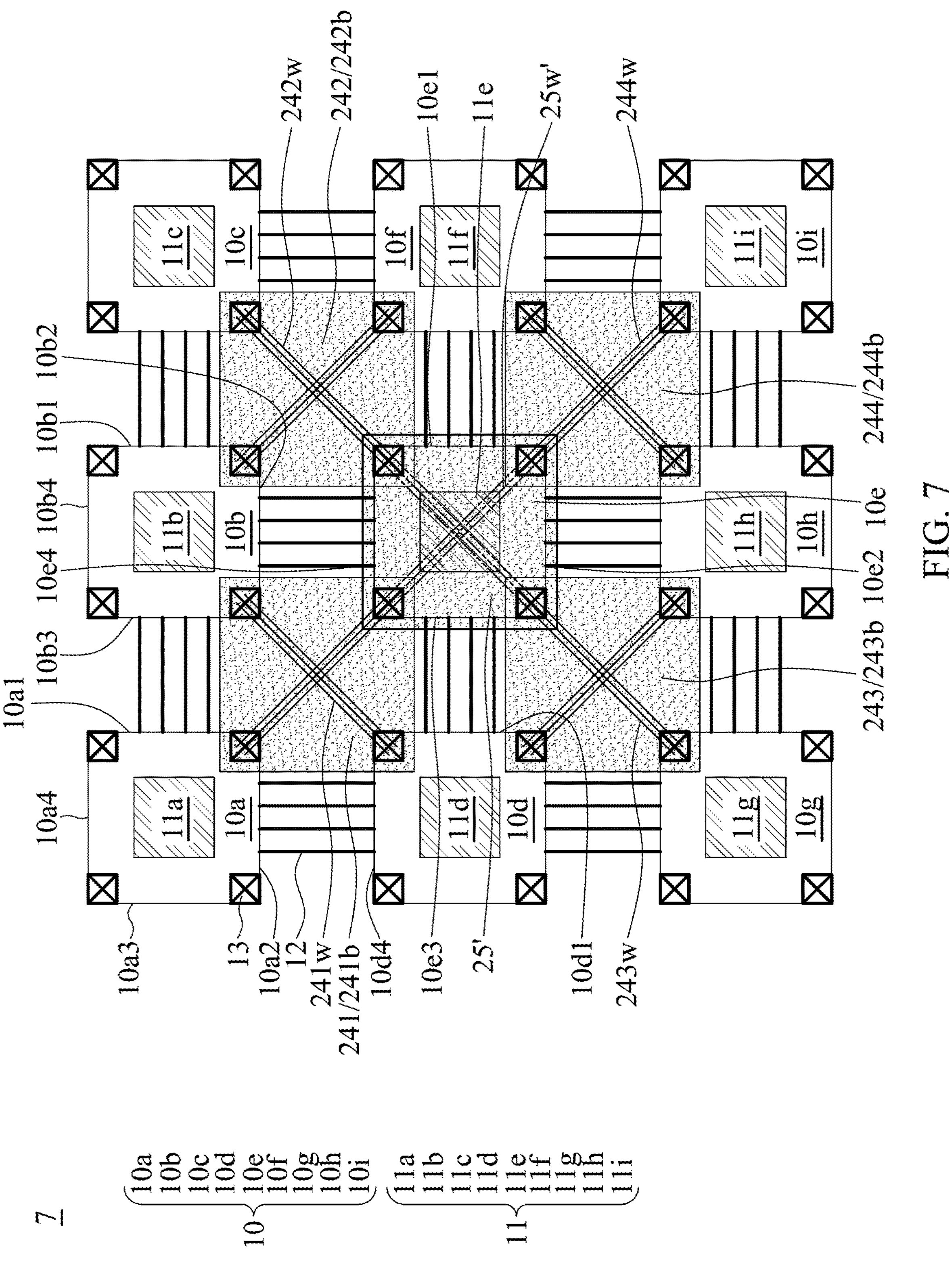
FIG. 7 is a top view of an optical device according to some embodiments of the present disclosure.

FIG. 7 is a top view of an optical device 7 according to some embodiments of the present disclosure. The optical device 7 in FIG. 7 is similar to the optical device 6 in FIG. 6. Therefore, some detailed descriptions may refer to corresponding preceding paragraphs and are not repeated hereinafter for conciseness, with differences therebetween as follows.

The optical interposer 25' includes waveguides 25*w'* having different patterns than the waveguides 25*w* of the optical interposer 25 of FIG. 6. The waveguides 25*w'* may have two sets of waveguides extending diagonal to the photonic component 10*e*. The optical interposers 241, 242, 243, 244 of the optical interposer 24 may respectively include waveguides 241*w*1', 242*w*1', 243*w*1', and 244*w*1'. The waveguides 241*w*1', 242*w*1', 243*w*1', and 244*w*1' may have different a layout than the waveguides 241*w*1, 242*w*1, 243*w*1, and 244*w*1 of FIG. 6. The waveguides 241*w*1', 242*w*1', 243*w*1', and 244*w*1' may each include at least one waveguide extending diagonally between two non-adjacent photonic components. The waveguides 25*w'* may be optically coupled to the waveguides 241*w*1', 242*w*1', 243*w*1', and 244*w*1'.

Figure 8:
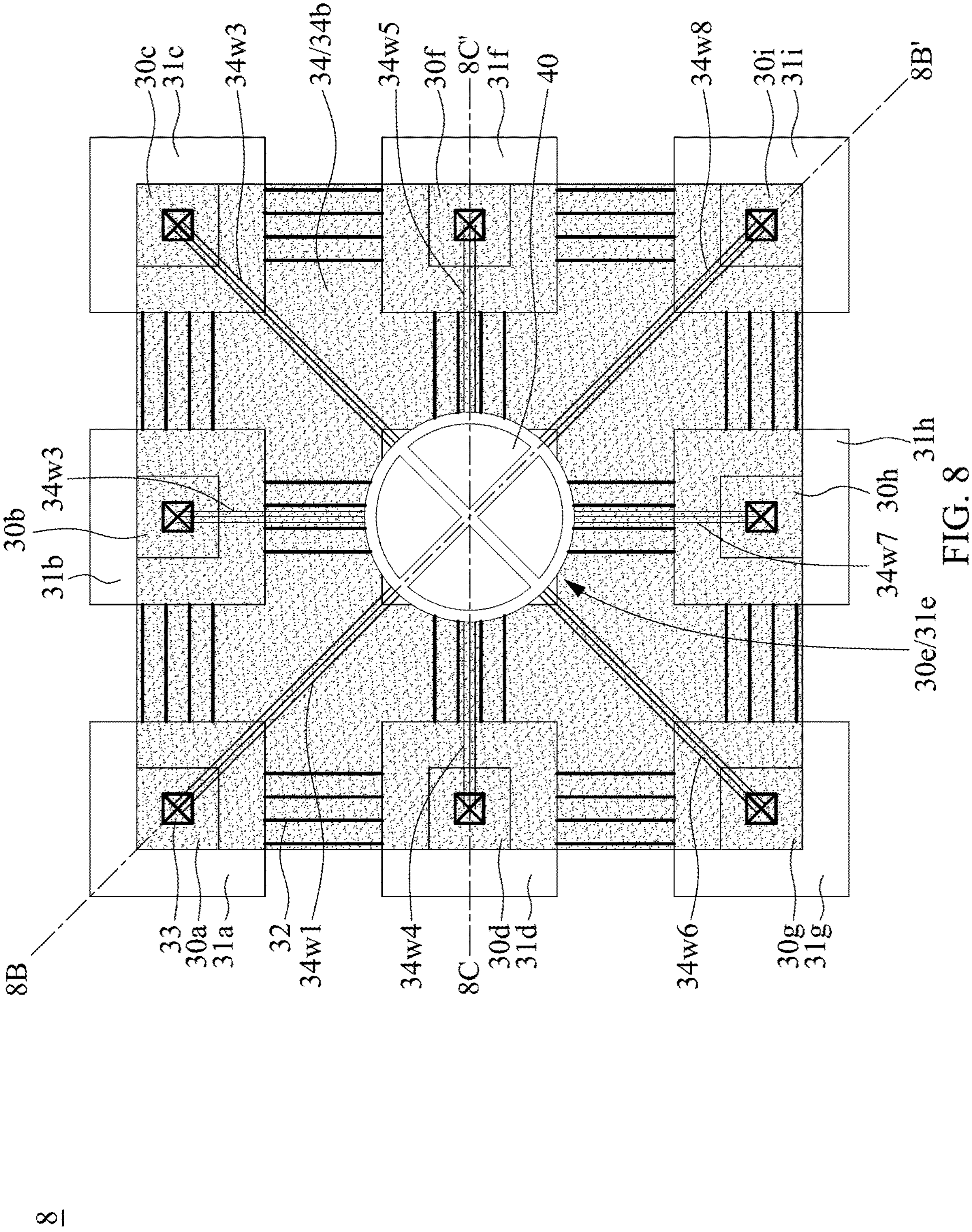
FIG. 8 is a top view of an optical device according to some embodiments of the present disclosure.

FIG. 8 is a top view of an optical device 8 according to some embodiments of the present disclosure. The optical device 8 may include a plurality of photonic components 30, a plurality of electrical components 31, a plurality of conductive wires 32, a plurality of input/output units (I/O units) 33, an optical interposer 34, and an optical multiplexer 40.

The photonic components 30 includes photonic components 30*a*, 30*b*, 30*c*, 30*d*, 30*e*, 30*f*, 30*g*, 30*h*, and 30*i*. Each of the photonic components 30*a*, 30*c*, 30*g*, and 30*i* may be referred to as a corner photonic component. Each of the photonic components 30*b*, 30*d*, 30*f*, and 30*h* may be referred to as a side photonic component. The photonic component 30*e* may be referred to as a center photonic component. The photonic components 30 may be arranged as an array, e.g., 3*3 array as shown in FIG. 8. FIG. 8 illustrates one arrangement of the photonic components 30 but does not limit the scope of the present disclosure. In yet another embodiment, the photonic components 30 may include more photonic components arranged in an array, e.g., M*N, wherein M is a positive integer and N is a positive integer.

The photonic components 30 may be configured to receive and process an optical signal and output an electrical signal to, for example, the electrical components 31. The photonic components 30 may be configured to receive and process an electrical signal and output an optical signal to, for example, the optical interposer 34. The photonic components 30 may each include a photonic IC (PIC). The photonic components 30 may each include, for example, but are not limited thereto, a waveguide, an electro-optic conversion unit (such as a photodiode or a laser), a beam splitter, a modulator, etc.

The electrical components 31 may include electrical components 31*a*, 31*b*, 31*c*, 31*d*, 31*e*, 31*f*, 31*g*, 31*h*, and 31*i*. Each of the electrical components 31*a*, 31*c*, 31*g*, and 31*i* may be referred to as a corner electrical component. Each of the electrical components 31*b*, 31*d*, 31*f*, and 31*h* may be referred to as a side electrical component. The electrical components 31*e* may be referred to as center electrical components. The electrical components 31 may be arranged as an array, e.g., 3*3 array as shown in FIG. 8. FIG. 8 illustrates one arrangement of the electrical components 31 but does not limit the scope of the present disclosure. In yet another embodiment, the electrical components 31 may include more electrical components arranged in an array, e.g., M*N, wherein M is a positive integer and N is a positive integer.

Each of the electrical components 31 may be configured to communicate with the corresponding one of the photonic components 30. Each of the electrical components 31 may be electrically connected to the corresponding photonic component. Each of the electrical components 31 may surround the corresponding photonic component. Furthermore, each of the electrical components 31 may be embedded in the corresponding photonic component. For example, the electrical component 31*a* may be configured to communicate with, be electrically connected to, be surrounded by, and/or be embedded in the corresponding photonic component 10*a*. Each of the electrical components 31 may include a passive component, such as a resistor, or an active component, such as an amplifier. The electrical components 31 may be configured to modulate or amplify the signals from the photonic components 30.

The conductive wires 32 may be disposed between the two directly adjacent photonic components 30. For example, the conductive wires 32 may be disposed between the photonic components 30*a* and 30*b*, 30*a* and 30*d*, etc. The two directly adjacent photonic components 30 may be configured to communicate with each other in an electrical path established in the conductive wires 32. The conductive wires 32 may extend in a direction substantially normal to the lateral surfaces of the connected photonic components 30. The conductive wires 32 may include metal such as copper (Cu), gold (Au), aluminum (Al), titanium (Ti) or the like. The conductive wires 32 may be covered by or embedded in a dielectric layer (not shown in FIG. 8 for brevity).

The I/O units (or transceivers) 33 may be disposed in the photonic components 30. The I/O units 33 may be disposed at the corners of each of the photonic components 30. For example, the I/O units 33 may be disposed at the corners of the photonic component 30*a*. The I/O units 33 may be optically coupled with the photonic components 30, e.g., the waveguides therein. The I/O units 33 may include a grating structure transmitting an optical signal to the optical interposer 34 or receiving an optical signal from the optical interposer 34. The I/O units 33 and the conductive wires 32 may have different pattern densities. The pattern density of the conductive wires 32 may be greater than that of the I/O units 33. In some embodiments, the conductive wires 32 may have a relatively high bandwidth.

The optical interposer 34 may be disposed over the photonic components 30, the electrical components 31, the conductive wires 32, and/or the I/O units 33. The optical interposer 34 may cover the photonic components 30, the electrical components 31, the conductive wires 32, and/or the I/O units 13. The area of the optical interposer 34 may be substantially equal to the distribution area of the photonic components 30. The optical interposer 34 may be formed in one piece. For the purpose of explaining the location relationship of the photonic components 30, the electrical components 31, and the optical interposer 34, the photonic components 30 and the electrical components 31 disposed below the optical interposer 34 may be depicted with solid lines. The optical interposer 34 may include, for example, but is not limited thereto, a silicon, silicon oxide, or silicon nitride, etc.

The optical interposer 34 may include a body portion 34*b*. The optical interposer 34 may include a plurality of waveguides 34*w*1, 34*w*2, 34*w*3, 34*w*4, 34*w*5, 34*w*6, 34*w*7, and 34*w*8. The waveguides 34*w*1, 34*w*2, 34*w*3, 34*w*4, 34*w*5, 34*w*6, 34*w*7, and 34*w*8 may be disposed between the corner photonic component and the center photonic component 30*e*. For example, the waveguides 34*w*1 may be disposed between the photonic components 30*a* and 30*e*. The waveguides 34*w*1, 34*w*2, 34*w*3, 34*w*4, 34*w*5, 34*w*6, 34*w*7, and 34*w*8 may each include at least one waveguide extending diagonally between two non-adjacent photonic components. The waveguides 34*w*1, 34*w*2, 34*w*3, 34*w*4, 34*w*5, 34*w*6, 34*w*7, and 34*w*8 may be separated from each other. The waveguides 34*w*1, 34*w*2, 34*w*3, 34*w*4, 34*w*5, 34*w*6, 34*w*7, and 34*w*8 may respectively optically couple to the photonic components 30*a*, 30*b*, 30*c*, 30*d*, 30*f*, 30*g*, 30*h*, and 30*h*. The waveguides 34*w*1, 34*w*2, 34*w*3, 34*w*4, 34*w*5, 34*w*6, 34*w*7, and 34*w*8 have a relatively low power loss during the signal transmission compared to the conductive wires 32.

The optical interposer 34 may surround the optical multiplexer 40. The waveguides 34*w*1, 34*w*2, 34*w*3, 34*w*4, 34*w*5, 34*w*6, 34*w*7, and 34*w*8 may be optically coupled to the optical multiplexer 40. The optical multiplexer 40 and the optical interposer 34 with waveguides 34*w*1-34*w*8 may function as a bridge unit optically coupling to the photonic components 30. The detailed descriptions will be provided in the following paragraphs. The optical multiplexer 40 may include a fixed optical add/drop multiplexer (FOADM). The optical multiplexer may include an arbitrary waveform generator (AWG) FOADM.

Figure 8A:
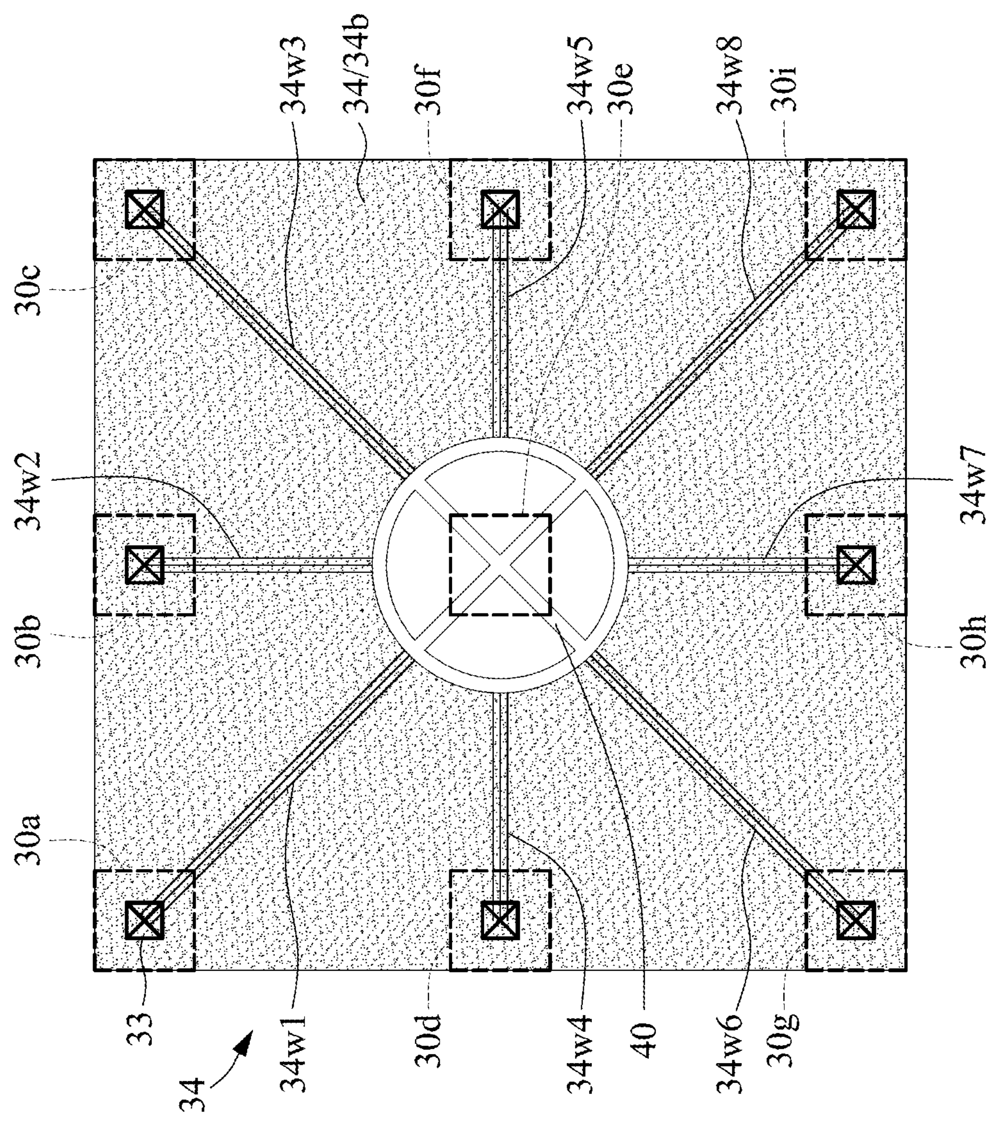
FIG. 8A is a top view of an optical interposer according to some embodiments of the present disclosure.

FIG. 8A is a top view of an optical interposer (e.g., the optical interposer 34) and an optical multiplexer (e.g., the optical multiplexer 40) according to some embodiments of the present disclosure. FIG. 8A provides a complete layout of the optical interposer 34. The optical interposer 34 may cover the photonic components 30*a*-30*d* and 30*f*-30*i*, which are depicted as dashed enclosures in FIG. 8A. The optical multiplexer 40 may cover the photonic component 30*e*. The I/O units 33 are presented in FIG. 8A for the purpose of explaining the connection between the waveguides 34*w*1-34*w*8 and the I/O units 33.

Figure 8B:
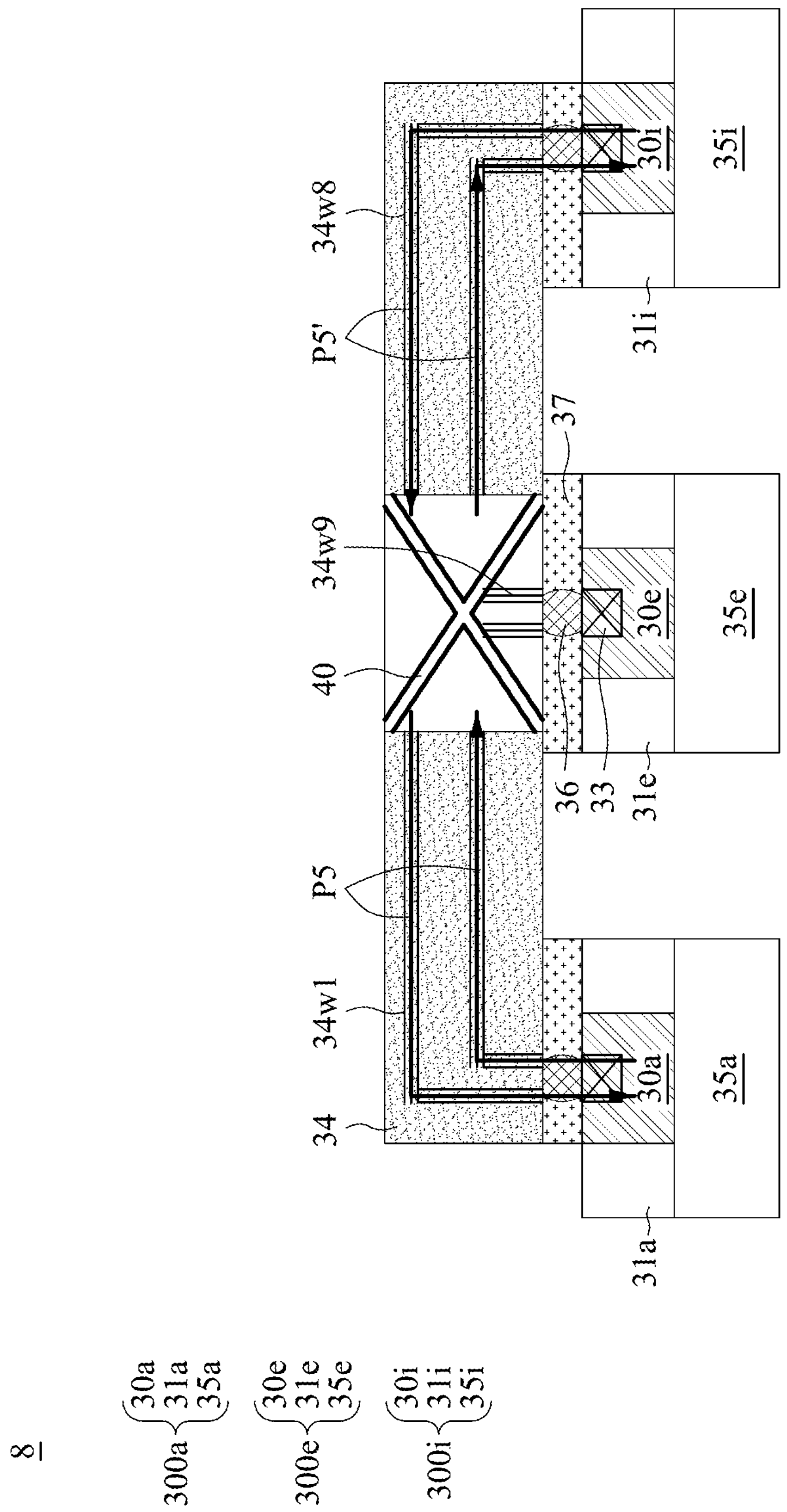
FIG. 8B is a cross section of an optical device according to some embodiments of the present disclosure.

FIG. 8B is a cross section of an optical device according to some embodiments of the present disclosure. FIG. 8B may be a cross section along the line 8B-8B' of FIG. 8.

The optical device 8 may include a plurality of components 35*a*, 35*e*, and 35*i*, respectively disposed below the photonic components 30*a*, 30*e*, and 30*i*. The photonic component 30*a*, the electrical component 31*a*, and the component 35*a* may be referred to as a die 300*a*. Other associated photonic components, electrical components, etc., may be referred to as dies, such as dies 300*e* and 300*i*. The photonic component 30*a* and the electrical component 31*a* may be stacked on the component 35*a*. The component 35*a* may include a central processing unit (CPU), a microprocessor unit (MPU), a graphics processing unit (GPU), a microcontroller unit (MCU), and an application-specific integrated circuit (ASIC). The components 35*e* and 35*i* may be similar to the component 35*a*.

The optical device 8 may include a plurality of connection elements 36 connecting the waveguides of the optical interposer 34 and the I/O units 33. The connection elements 36 may include material for guiding the light (e.g., optical signals) therethrough. The connection elements 36 may include a photonic bump configured to optically transmit the light (e.g., optical signals) from the optical interposer 34 to the I/O units 33 or in an opposite direction. The optical device 8 may include a dielectric layer 37 disposed between the optical interposer 34 and the dies (e.g., the die 300*a*). The dielectric layer 37 may include an epoxy resin having fillers, a molding compound (e.g., an epoxy molding compound or other molding compound), polyimide, a phenolic compound or material, a material with a silicone dispersed therein, or a combination thereof.

Waveguides 34*w*9 may be disposed below the optical multiplexer 40 and optically couple the optical multiplexer 40 to the I/O units 33 of the photonic component 10*e*. The photonic component 10*e* may communicate with the optical multiplexer 40 through an optical path, at least in the waveguides 34*w*9. The photonic component 10*a* may communicate with the optical multiplexer 40 through an optical path P5, at least in the waveguides 34*w*1. The photonic component 10*i* may communicate with the optical multiplexer 40 through an optical path P5', at least in the waveguides 34*w*8. FIG. 8 illustrates two opposite arrows indicating the bi-directional signal transmission in two sets of waveguides (e.g., the waveguide 34*w*1). In some embodiments, the signal transmission may be performed in the same set of waveguides in a time-division manner.

Figure 8C:
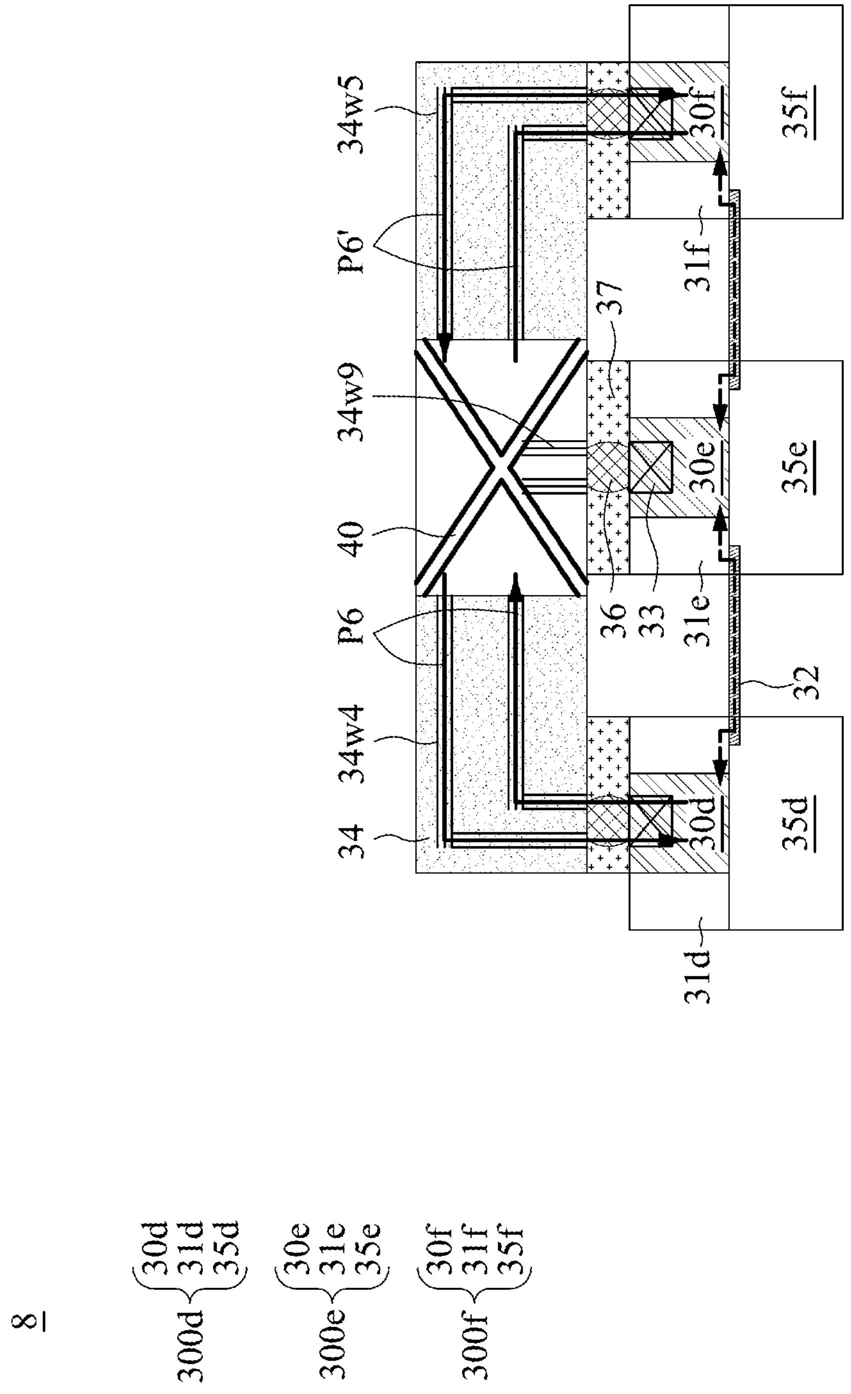
FIG. 8C is a cross section of an optical device according to some embodiments of the present disclosure.

FIG. 8C is a cross section of an optical device according to some embodiments of the present disclosure. FIG. 8C may be a cross section along the line 8C-8C' of FIG. 8.

The optical device 3 may include a plurality of components 35*d*, 35*e*, and 35*f*, respectively disposed below the photonic components 30*d*, 30*e*, and 30*f*. The photonic component 30*d*, the electrical component 31*d*, and the component 35*d* may be referred to as a die 300*d*. Other associated photonic components, electrical components, etc., may be referred to as dies, such as die 300*f*.

As shown in FIG. 8C, the conductive wires 32 may have a portion extending in the components 35*d*, 35*e*, and 35*f*. The conductive wires 32 may be electrically connected to the electrical components 31*d*, 31*e*, and 31*f*. The conductive wires 32 may be electrically connected to the components 35*d*, 35*e*, and 35*f*. The photonic component 30*d* (or the die 300*d*) may be configured to communicate with the directly adjacent photonic component 30*e* (or the die 300*e*) through an electrical path E5 at least established in the electrical components 31*d* and 31*e*, the components 35*d* and 35*e*, and the conductive wires 32. Similarly, the photonic component 30*e* (or the die 300*e*) may be configured to communicate with the directly adjacent photonic component 30*f* (or the die 300*f*) through an electrical path E5' at least established in the electrical components 31*e* and 31*f*, the components 35*e* and 35*f*, and the conductive wires 32.

The photonic component 10*d* may communicate with the optical multiplexer 40 through an optical path P6, at least in the waveguides 34*w*4. The photonic component 10*f* may communicate with the optical multiplexer 40 through an optical path P6', at least in the waveguides 34*w*5.

Figure 8D:
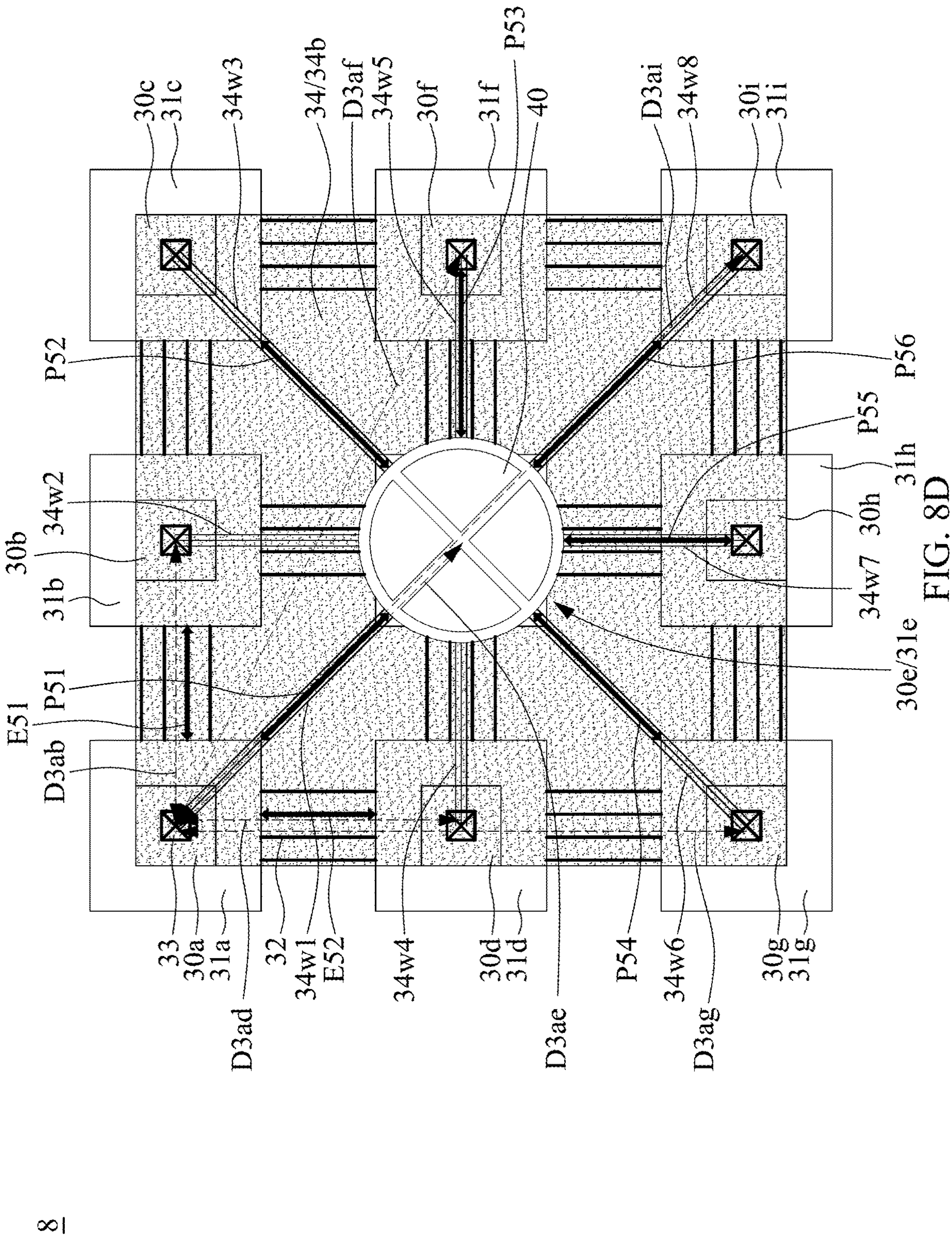
FIG. 8D is a schematic diagram of one of the states of an optical device according to some embodiments of the present disclosure.
Figure 8E:
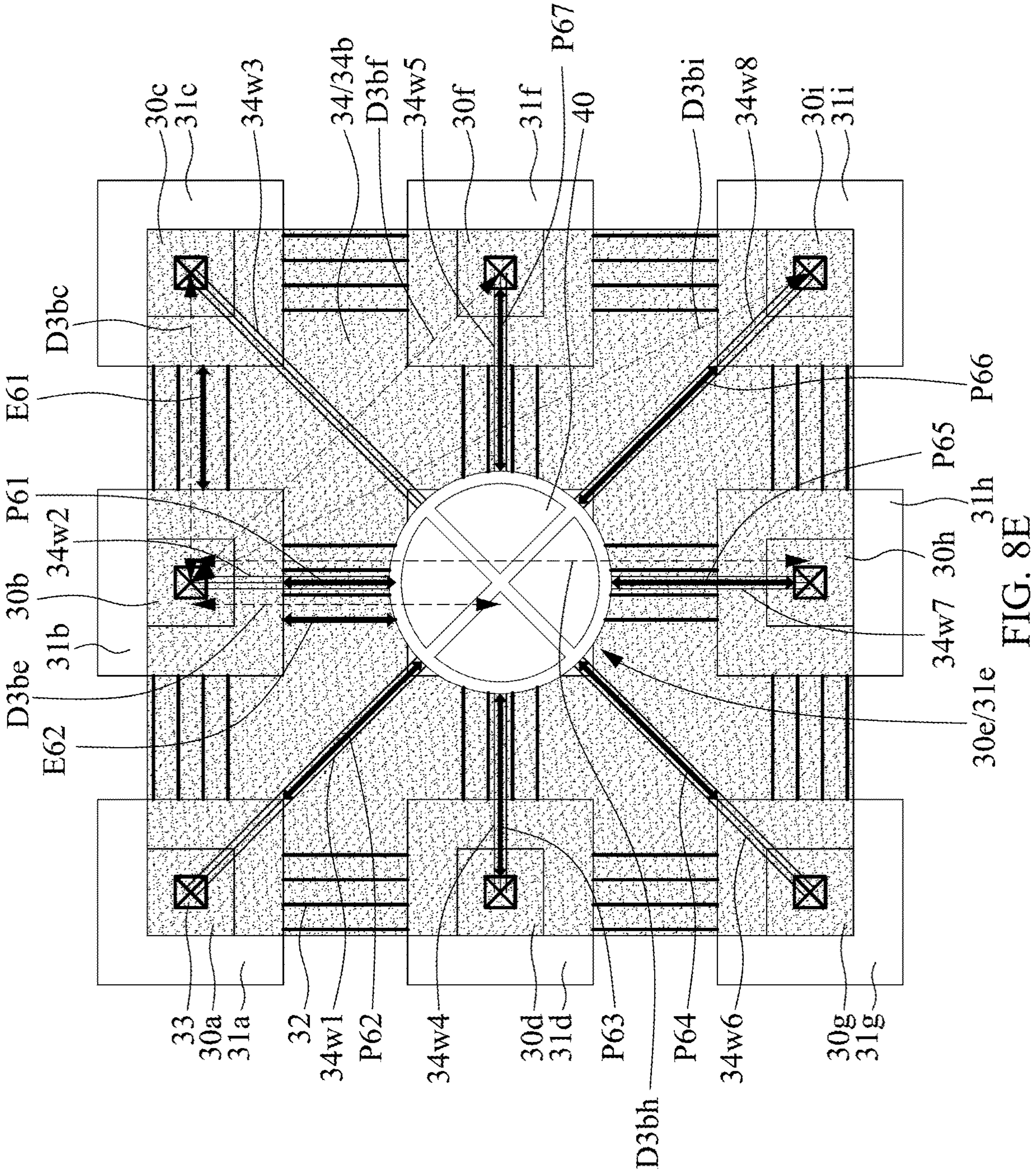
FIG. 8E is a schematic diagram of one of the states of an optical device according to some embodiments of the present disclosure.
Figure 8F:
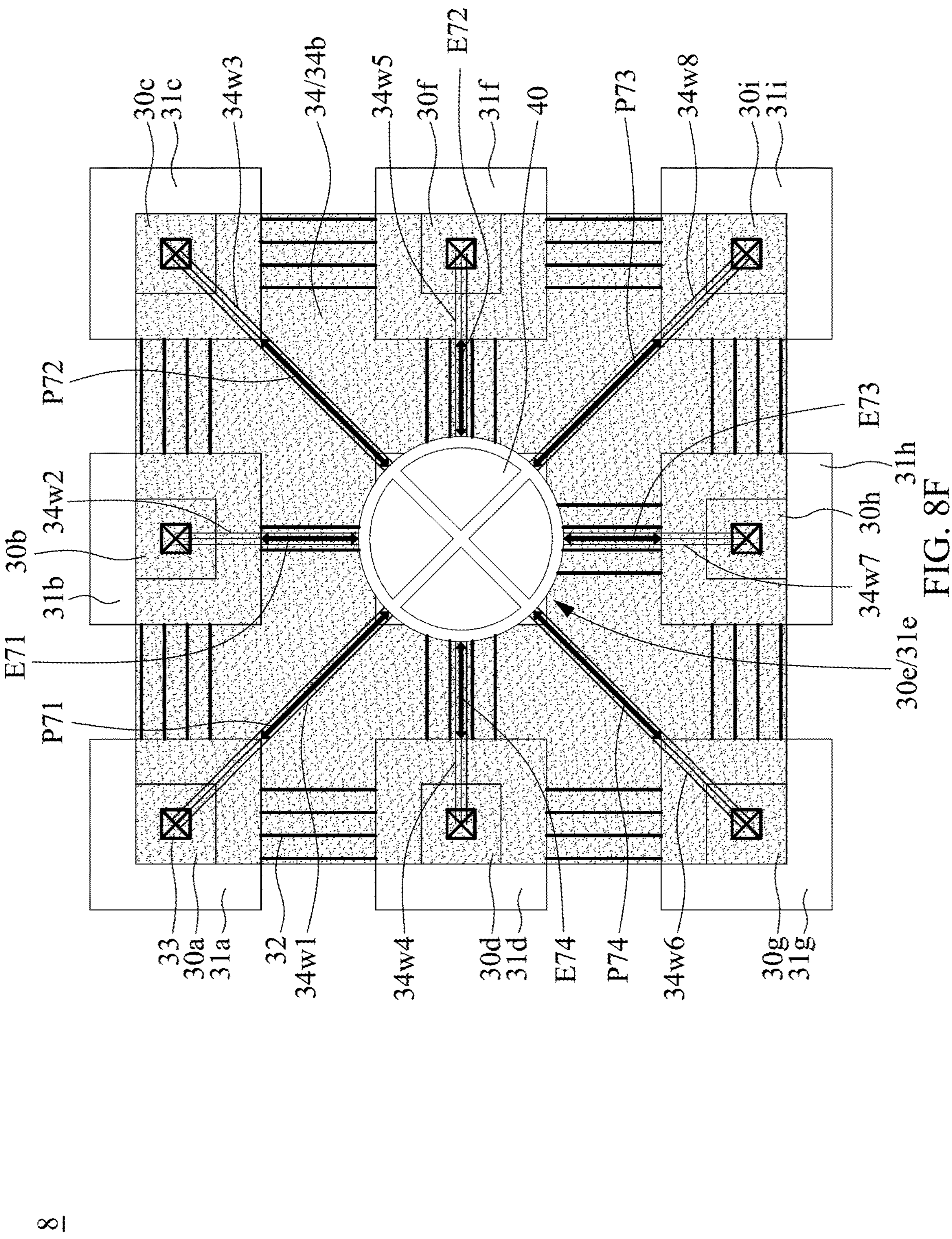
FIG. 8F is a schematic diagram of one of the states of an optical device according to some embodiments of the present disclosure.

In the present disclosure, one of the photonic components 30 may be configured to communicate with the other photonic components through an optical path or an electrical path depending on a distance between the aforesaid photonic components. In other words, one of the dies (e.g., the dies 300*a*, 300*e*, etc.) may be configured to determine whether the photonic components of the dies are communicative through an optical path or an electrical path based on the distance between the photonic components of the dies. The detailed descriptions are provided in the following FIGS. 8D, 8E, and 8F. A distance between two of the photonic components 30 may be defined by the center of one photonic component to the center of the other photonic component as illustrated in FIGS. 8D, 8E, and 8F. In some embodiments, a distance between two of the photonic components 30 may be defined by the edge of one photonic component to the edge of the other photonic component.

The optical transmission between the photonic components 30 may be controlled by the optical multiplexer 40. The optical multiplexer 40 may be configured to receive the optical signal with one or more specified wavelengths and multiplex it into one or more optical signals, each of which has one specified wavelength. Subsequently, the optical multiplexer 40 may transmit each of the optical signals to the corresponding one of the photonic components 30 through one of the waveguides 34*w*1-34*w*8 of the optical interposer 34. Each of the photonic components 30 may have a corresponding wavelength (or a specified wavelength). In some embodiments, each of the photonic components 30 may have a corresponding wavelength range. In particular, the I/O units 33 of each of the photonic components 30 may receive the corresponding wavelength (or the specified wavelength) and filter out other wavelengths, if any, corresponding to the other photonic components. Each of the photonic components 30 may be configured to generate a light or an optical signal with a wavelength corresponding to one or more of the photonic components 30 and transmit the light (or the optical signal) to the optical multiplexer 40. The optical device 8 may perform a frequency/wavelength division transmission between the photonic components 30 by the optical multiplexer 40 and the optical interposer 34.

FIG. 8D is a schematic diagram of one of the states of an optical device (e.g., the optical device 8) according to some embodiments of the present disclosure. The photonic component (or the corner photonic component) 30*a* may be configured to communicate with the other photonic components through an optical path or an electrical path depending on a distance between the aforesaid photonic components. When a distance between the aforesaid photonic components is larger than a distance between two photonic components in the optical device, the photonic component 30*a* is configured to communicate with the other photonic component through an optical path. In particular, when a distance between the aforesaid photonic components is larger than a minimum distance between two directly adjacent photonic components in the optical device, the photonic component 30*a* is configured to communicate with the other photonic components through an optical path. When a distance between the aforesaid photonic components equals the minimum distance, the photonic component 30*a* is configured to communicate with the other photonic component through an electrical path.

The photonic component 30*a* is directly adjacent to the photonic component 30*b*. A distance D3*ab* between the photonic components 30*a* and 30*b* equals the minimum distance. The photonic component 30*a* is configured to communicate with the photonic component 30*b* through an electrical path E51, e.g., at least in the conductive wires 32. The electrical path E51 may be similar to the electrical path E5 as shown in FIG. 8C.

The photonic component 30*a* is directly adjacent to the photonic component 30*d*. A distance D3*ad* between the photonic components 30*a* and 30*d* equals the minimum distance. The photonic component 30*a* is configured to communicate with the photonic component 30*d* through an electrical path E52, e.g., at least in the conductive wires 32. The electrical path E52 may be similar to the electrical path E5 as shown in FIG. 8C.

The photonic component 30*a* is non-adjacent to the photonic components 30*c*, 30*e*, 30*f*, 30*g*, 30*h*, and 30*i*. A distance D3*ae* between the photonic components 30*a* and 30*e* is larger than at least one distance (e.g., the distance D3*ab*) between the photonic components 30 or the minimum distance; a distance D3*af* between the photonic components 30*a* and 30*f* is larger than at least one distance (e.g., the distance D3*ab* or D3*ae*) between the photonic components 30 or the minimum distance; a distance D3*ag* between the photonic components 30*a* and 30*g* is larger than at least one distance (e.g., the distance D3*ab* or D3*ae*) between the photonic components 30 or the minimum distance; a distance D3*ai* between the photonic components 30*a* and 30*i* is larger than at least one distance (e.g., the distance D3*ab* or D3*ae*) between the photonic components 30 or the minimum distance. The photonic component 30*a* is configured to communicate with the non-adjacent photonic component 30 through an optical path P51, e.g., at least in the waveguides 34*w*1 and the optical multiplexer 40, and an optical path in at least the waveguide corresponding to one non-adjacent photonic component. For example, an optical path P52 is established in the waveguide 34*w*3 corresponding to the photonic component 30*c*; an optical path P53 is established in the waveguide 34*w*5 corresponding to the photonic component 30*f*; an optical path P54 is established in the waveguide 34*w*6 corresponding to the photonic component 30*g*; an optical path P55 is established in the waveguide 34*w*7 corresponding to the photonic component 30*h*; and an optical path P56 is established in the waveguide 34*w*8 corresponding to the photonic component 30*i*.

The optical path P51, P52, P54, and P56 may be similar to the optical path P5 as shown in FIG. 8B. The optical path P53 and P55 may be similar to the optical path P6 as shown in FIG. 8C.

FIG. 8E is a schematic diagram of one of the states of an optical device according to some embodiments of the present disclosure. The photonic component (or the side photonic component) 30*b* may be configured to communicate with the other photonic components through an optical path or an electrical path depending on a distance between the aforesaid photonic components. When a distance between the aforesaid photonic components is larger than a distance between two photonic components in the optical device, the photonic component 30*b* is configured to communicate with the other photonic component through an optical path. In particular, when a distance between the aforesaid photonic components is larger than a minimum distance between two directly adjacent photonic components in the optical device, the photonic component 30*b* is configured to communicate with the other photonic component through an optical path. When a distance between the aforesaid photonic components equals the minimum distance, the photonic component 30*b* is configured to communicate with the other photonic component through an electrical path.

The photonic component 30*b* is directly adjacent to the photonic component 30*c*. A distance D3*bc* between the photonic components 30*b* and 30*c* equals the minimum distance. The photonic component 30*b* is configured to communicate with the photonic component 30*b* through an electrical path E61, e.g., at least in the conductive wires 32. The electrical path E61 may be similar to the electrical path E5 as shown in FIG. 8C.

The photonic component 30*b* is directly adjacent to the photonic component 30*e*. A distance D3*be* between the photonic components 30*b* and 30*e* equals the minimum distance. The photonic component 30*b* is configured to communicate with the photonic component 30*b* through an electrical path E62, e.g., at least in the conductive wires 32. The electrical path E62 may be similar to the electrical path E5 as shown in FIG. 8C.

The photonic component 30*b* is non-adjacent to the photonic components 30*d*, 30*f*, 30*g*, 30*h*, and 30*i*. A distance D3*bf* between the photonic components 30*b* and 30*f* is larger at least one distance (e.g., the distance D3*bc*) between the photonic components 30 or than the minimum distance; a distance D3*bh* between the photonic components 30*b* and 30*h* is larger than at least one distance (e.g., the distance D3*bc* or D3*bf*) between the photonic components 30 or the minimum distance; a distance D3*bi* between the photonic components 30*b* and 30*i* is larger than at least one distance (e.g., the distance D3*bc* or D3*bf*) between the photonic components 30 or the minimum distance. The photonic component 30*b* is configured to communicate with the non-adjacent photonic component 30*e* through an optical path P61, e.g., at least in the waveguides 34*w*2 and the optical multiplexer 40, and an optical path in at least the waveguide corresponding to one non-adjacent photonic component. For example, an optical path P62 is identical to the optical path P51 of FIG. 8D; an optical path P63 is established in the waveguide 34*w*4 corresponding to the photonic component 30*d*; an optical path P64 is identical to the optical P54; an optical path P65 is identical to the optical path P55 of FIG. 8D; an optical path P66 is identical to the optical path P66 of FIG. 8D; and an optical path P67 is established in the waveguide 34*w*5 corresponding to the photonic component 30*f*.

The optical paths P62, P64, and P66 may be similar to the optical path P5 as shown in FIG. 8B. The optical paths P61, P63, P65, and P67 may be similar to the optical path P6 as shown in FIG. 8C.

FIG. 8F is a schematic diagram of one of the states of an optical device according to some embodiments of the present disclosure. The photonic component (or the side photonic component) 30*e* may be configured to communicate with the other photonic components through an optical path or an electrical path depending on a distance between the aforesaid photonic components. When a distance between the aforesaid photonic components is larger than a distance between two photonic components in the optical device, the photonic component 30*e* is configured to communicate with the other photonic component through an optical path. In particular, when a distance between the aforesaid photonic components is larger than a minimum distance between two directly adjacent photonic components in the optical device, the photonic component 30*e* is configured to communicate with the other photonic component through an optical path. When a distance between the aforesaid photonic components equals the minimum distance, the photonic component 30*e* is configured to communicate with the other photonic component through an electrical path.

The photonic component 30*e* is directly adjacent to the photonic components 30*b*, 30*d*, 30*f*, and 30*h*. A distance between the photonic component 30*e* and the photonic components 30*b*, 30*d*, 30*f*, or 30*h* equals the minimum distance. The photonic component 30*e* is configured to respectively communicate with the photonic component 30*b*, 30*d*, 30*f*, and 30*h* through electrical paths E71, E72, E73, and E74, e.g., at least in the conductive wires 32. The electrical paths E71, E72, E73, and E74 may be similar to the electrical path E5 as shown in FIG. 8C.

The photonic component 30*e* is non-adjacent to the photonic components 30*a*, 30*c*, 30*g*, and 30*i*. A distance between the photonic component 30*e* and the photonic components 30*a*, 30*c*, 30*g*, or 30*i* is larger than at least one distance (e.g., the distance D3*ae*) between the photonic components 30 or the minimum distance. The photonic component 30*e* is configured to communicate with the non-adjacent photonic components 30*a*, 30*c*, 30*g*, and 30*i* through an optical path, e.g., at least in the waveguide 34*w*9 (in FIG. 8B) and the optical multiplexer 40, and respectively, optical paths P71, P72, P73, and P74. For example, the optical path P71 is identical to the optical path P51 of FIG. 8D; the optical path P72 is established in the waveguide 34*w*3 corresponding to the photonic component 30*c*; the optical path P73 is identical to the optical path P56 of FIG. 8D; and the optical path P74 is identical to the optical P54. The optical paths P71-P74 may be similar to the optical path P5 as shown in FIG. 8B.

According to the relevant descriptions of FIGS. 8D, 8E, and 8F, in the case that one of the photonic components 30 is directly adjacent to another of the photonic components 30, the one photonic component is configured to communicate with the other photonic component through an electrical path. For example, the photonic component 30*a* is configured to communicate with the photonic component 30*b* through the electrical path E51; the photonic component 30*b* is configured to communicate with the photonic component 30*e* through the electrical path E62. In the case that one of the photonic components 30 is non-adjacent to another of the photonic components 30, the one photonic component is configured to communicate with the other photonic component. For example, the photonic component 30*a* is configured to communicate with the photonic component 30*e* through the optical path P51; the photonic component 30*a* is configured to communicate with the photonic component 30*i* through the optical paths P51 and P56; the photonic component 10*e* is configured to communicate with the photonic component 30*i* through the optical path P73. The photonic component 30*b* is disposed between the photonic components 30*a* and 30*i*. In some embodiments, the optical multiplexer 40 may be configured to connect the optical path P51 with the optical path P73.

Based on the distance between the photonic components 30 (or the associated dies), the photonic components 30 be configured to communicate with other photonic components of the optical device 8 through an electrical path or an optical path. The dies may be configured to compare the distances between the photonic components 30 or a distance between two photonic components 30 and the minimum distance, e.g., by a comparator. The directly adjacent photonic components 30 (the distance equals the minimum distance) are configured to communicate with each other through the conductive wires (i.e., the electrical path) with a relatively high bandwidth. The non-adjacent photonic components 30 (the distance larger than at least one of the other distance or the minimum distance) are configured to communicate with each other through the optical interposer 34 and the optical multiplexer 40 which have a relatively low power loss. Furthermore, having the optical path and the electrical path in the optical device 8 increases the overall transmission bandwidth among the photonic components.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such an arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Two surfaces can be deemed to be coplanar or substantially coplanar if a displacement between the two surfaces is no greater than 5 μm, no greater than 2 μm, no greater than 1 μm, or no greater than 0.5 μm.

As used herein, the singular terms "a," "an," and "the" may include plural referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An optical device, comprising:

a first photonic component; and a second photonic component, wherein the first photonic component is configured to communicate with the second photonic component through either a first optical path or an electrical path depending on a first distance between the first photonic component and the second photonic component determined by a processing unit.

2. The optical device of claim 1, wherein in the case that the first photonic component is directly adjacent to the second photonic component as determined by the processing unit, the first photonic component is configured to communicate with the second photonic component through the electrical path.

3. The optical device of claim 2, wherein a first lateral surface of the first photonic component directly faces a second lateral surface of the second photonic component, wherein the first lateral surface is parallel with the second lateral surface, and wherein the first lateral surface overlaps the second lateral surface in a direction perpendicular to the first lateral surface.

4. The optical device of claim 1, wherein in the case that the first photonic component is non-adjacent to the second photonic component as determined by the processing unit, the first photonic component is configured to communicate with the second photonic component through the first optical path.

5. The optical device of claim 4, further comprising a third photonic component disposed between the first photonic component and the second photonic component, and the first photonic component is configured to communicate with the third photonic component through either a second electrical path or a second optical path depending on a second distance between the first photonic component and the third photonic component determined by the processing unit.

6. The optical device of claim 1, further comprising a third photonic component configured to communicate with the second photonic component through a second optical path and to communicate with the first photonic component through a third optical path, wherein a second distance between the first photonic component and the third photonic component and a third distance between the second photonic component and the third photonic component are determined by the processing unit.

7. The optical device of claim 6, wherein the first photonic component is configured to directly transmit a light to the third photonic component without an optical to electrical conversion.

8. The optical device of claim 6, wherein the first photonic component is configured to directly transmit a light to the third photonic component with at least one optical to electrical conversion.

9. The optical device of claim 6, wherein the second distance between the first photonic component and the third photonic component determined by the processing unit is larger than the third distance between the second photonic component and the third photonic component determined by the processing unit.

10. The optical device of claim 3, wherein the electrical path is closer to a center of the lateral surface of the first photonic component than the first optical path.

11. The optical device of claim 1, wherein, when the distance is larger than a minimum distance between two directly adjacent photonic components in the optical device, the first photonic component is configured to communicate with the second photonic component through the first optical path.

12. The optical device of claim 1, wherein, when the distance equals than a minimum distance between two directly adjacent photonic components in the optical device, the first photonic component is configured to communicate with the second photonic component through the electrical path.

13. The optical device of claim 1, wherein a first end of the first optical path is located adjacent to a corner of the first photonic component and a second end of the electrical path is located adjacent to an edge of the first photonic component, and wherein the corner is connected to the edge.

14. The optical device of claim 4, wherein none of lateral surfaces of the first photonic component directly faces the second photonic component.

15. The optical device of claim 4, wherein the second photonic component comprises a first optical region connected with the first optical path and a second optical region connected to a fiber array unit (FAU).

16. The optical device of claim 15, wherein the first optical path and the FAU are configured to transmit light with different wavelengths.

17. The optical device of claim 6, wherein the second optical path is across the second photonic component and the third photonic component without overlapping the first optical path.

18. The optical device of claim 17, wherein the third optical path is configured to connect the first optical path with the second optical path.

19. The optical device of claim 1, further comprising an electrical component disposed below the first photonic component and configured to modulate or amplify signals from the first photonic component.

20. The optical device of claim 1, further comprising a processing unit disposed below the first photonic component and configured to determine whether the first photonic component communicates with the second photonic component through the first optical path or the electrical path.

* * * * *